(12) United States Patent
Silver et al.

(10) Patent No.: US 12,066,836 B2
(45) Date of Patent: *Aug. 20, 2024

(54) DETECTING GENERAL ROAD WEATHER CONDITIONS

(71) Applicant: Waymo LLC, Mountain View, CA (US)

(72) Inventors: David Harrison Silver, San Carlos, CA (US); Jens-Steffen Ralf Gutmann, Cupertino, CA (US); Michael James, Northville, MI (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,966

(22) Filed: Apr. 7, 2023

(65) Prior Publication Data

US 2023/0315122 A1    Oct. 5, 2023

Related U.S. Application Data

(63) Continuation of application No. 17/079,693, filed on Oct. 26, 2020, now Pat. No. 11,650,603, which is a
(Continued)

(51) Int. Cl.
*G05D 1/00*        (2024.01)
*B60W 10/04*       (2006.01)
(Continued)

(52) U.S. Cl.
CPC .......... *G05D 1/0291* (2013.01); *B60W 10/04* (2013.01); *B60W 10/18* (2013.01); *B60W 10/20* (2013.01);
(Continued)

(58) Field of Classification Search
CPC .. G05D 1/0291; G05D 1/0214; G05D 1/0088; B60W 10/04; B60W 10/18;
(Continued)

(56) References Cited

U.S. PATENT DOCUMENTS 6,292,752 B1    9/2001  Franke et al.
7,016,783 B2    3/2006  Hac et al.
(Continued)

FOREIGN PATENT DOCUMENTS

CN    101823486 A    9/2010
CN    107844796 A    3/2018
(Continued)

OTHER PUBLICATIONS

Decision to Grant a Patent for Japanese Patent Application No. 2021-531304, Jun. 8, 2022.
(Continued)

*Primary Examiner* — Frederick M Brushaber
(74) *Attorney, Agent, or Firm* — Botos Churchill IP Law

(57) ABSTRACT

The technology relates to determining general weather conditions affecting the roadway around a vehicle, and how such conditions may impact driving and route planning for the vehicle when operating in an autonomous mode. For instance, the on-board sensor system may detect whether the road is generally icy as opposed to a small ice patch on a specific portion of the road surface. The system may also evaluate specific driving actions taken by the vehicle and/or other nearby vehicles. Based on such information, the vehicle's control system is able to use the resultant information to select an appropriate braking level or braking strategy. As a result, the system can detect and respond to different levels of adverse weather conditions. The on-board computer system may share road condition information with nearby
(Continued)

vehicles and with remote assistance, so that it may be employed with broader fleet planning operations.

20 Claims, 34 Drawing Sheets

Related U.S. Application Data continuation of application No. 16/217,235, filed on Dec. 12, 2018, now Pat. No. 10,852,746.

(51) Int. Cl.
| | | |
|---|---|---|
| *B60W 10/18* | (2012.01) | |
| *B60W 10/20* | (2006.01) | |
| *B60W 30/02* | (2012.01) | |
| *G01S 13/95* | (2006.01) | |
| *G01S 15/88* | (2006.01) | |
| *G01S 17/95* | (2006.01) | |
| *G01W 1/02* | (2006.01) | |

(52) U.S. Cl.
CPC .............. *B60W 30/02* (2013.01); *G01S 13/95* (2013.01); *G01S 15/885* (2013.01); *G01S 17/95* (2013.01); *G01W 1/02* (2013.01); *G05D 1/0214* (2013.01); *B60W 2300/12* (2013.01); *B60W 2300/145* (2013.01); *B60W 2420/403* (2013.01); *B60W 2420/408* (2024.01); *B60W 2420/54* (2013.01); *B60W 2552/00* (2020.02); *B60W 2555/20* (2020.02); *B60W 2710/18* (2013.01); *B60W 2710/20* (2013.01); *B60W 2720/106* (2013.01); *G01W 2203/00* (2013.01); *G05D 1/0088* (2013.01)

(58) Field of Classification Search
CPC .. B60W 10/20; B60W 30/02; B60W 2300/12; B60W 2300/145; B60W 2420/403; B60W 2420/408; B60W 2420/54; B60W 2552/00; B60W 2555/20; B60W 2710/18; B60W 2710/20; B60W 2720/106; B60W 30/18172; B60W 40/068; B60W 60/001; B60W 2050/0031; B60W 2554/4046; B60W 2556/45; B60W 2556/65; B60W 2720/10; B60W 40/06; B60W 30/08; B60W 30/10; B60W 30/18027; B60W 40/105; B60W 40/107; B60W 60/0016; B60W 2050/0005; B60W 2520/14; B60W 2554/4042; B60W 2555/60; B60W 40/02; B60W 2520/10; G01S 13/95; G01S 15/885; G01S 17/95; G01S 2013/9318; G01S 2013/93185; G01S 2013/9319; G01S 2013/932; G01S 2013/93273; G01S 13/862; G01S 13/865; G01S 13/867; G01S 13/956; G01S 2013/93271; G01S 2013/93272; G01S 13/931; G01S 15/86; G01S 15/931; G01S 17/931; G01W 1/02; G01W 2203/00; G01W 2001/006; G01W 1/14; G01C 21/3407; G01C 21/3602; G01C 21/3691; Y02A 90/10; G06V 20/58
See application file for complete search history.

(56) References Cited

U.S. PATENT DOCUMENTS

| | | |
|---|---|---|
| 7,124,027 B1 | 10/2006 | Ernst, Jr. et al. |
| 8,126,642 B2 | 2/2012 | Trepagnier et al. |
| 8,855,848 B2 | 10/2014 | Zeng |
| 9,157,749 B2 | 10/2015 | Aoki et al. |
| 9,435,652 B2 | 9/2016 | Ralston et al. |
| 9,568,915 B1 | 2/2017 | Berntorp et al. |
| 9,576,480 B1 | 2/2017 | Shoshan |
| 9,760,090 B2 | 9/2017 | Shashua et al. |
| 9,947,224 B2 | 4/2018 | Fairfield et al. |
| 9,958,864 B2 | 5/2018 | Kentley-Klay et al. |
| 2003/0144777 A1 | 7/2003 | Schmitt |
| 2004/0193374 A1 | 9/2004 | Hac et al. |
| 2005/0033517 A1 | 2/2005 | Kondoh et al. |
| 2006/0287817 A1 | 12/2006 | Nagel |
| 2009/0093927 A1 | 4/2009 | Mueller-Schneiders et al. |
| 2010/0228427 A1 | 9/2010 | Anderson et al. |
| 2015/0025789 A1 | 1/2015 | Einecke et al. |
| 2015/0197225 A1 | 7/2015 | Raste et al. |
| 2015/0338524 A1 | 11/2015 | Ben Moshe et al. |
| 2016/0121890 A1* | 5/2016 | Han ................ B60W 30/16 701/93 |
| 2016/0159368 A1 | 6/2016 | Tuukkanen |
| 2017/0166216 A1 | 6/2017 | Rander et al. |
| 2017/0167881 A1 | 6/2017 | Rander et al. |
| 2017/0168495 A1 | 6/2017 | Wood et al. |
| 2017/0168500 A1 | 6/2017 | Bradley et al. |
| 2017/0234689 A1 | 8/2017 | Gibson et al. |
| 2017/0236210 A1 | 8/2017 | Kumar et al. |
| 2017/0336794 A1 | 11/2017 | Shashua et al. |
| 2018/0079424 A1* | 3/2018 | Myers ................. B60W 30/02 |
| 2018/0086344 A1 | 3/2018 | Zhu et al. |
| 2018/0088582 A1 | 3/2018 | Kong et al. |
| 2018/0120855 A1 | 5/2018 | Christiansen et al. |
| 2018/0129215 A1 | 5/2018 | Hazelton et al. |
| 2018/0151066 A1 | 5/2018 | Oba |
| 2018/0196440 A1 | 7/2018 | Zhu et al. |
| 2018/0201182 A1 | 7/2018 | Zhu |
| 2018/0211546 A1 | 7/2018 | Smartt et al. |
| 2018/0244275 A1 | 8/2018 | Bremkens et al. |
| 2018/0307729 A1* | 10/2018 | Averbuch ............... G06F 16/29 |
| 2018/0341276 A1 | 11/2018 | Kislovskiy et al. |
| 2019/0049948 A1 | 2/2019 | Patel et al. |
| 2019/0120640 A1 | 4/2019 | Ho et al. |
| 2019/0187705 A1 | 6/2019 | Ganguli et al. |
| 2019/0187706 A1 | 6/2019 | Zhou et al. |
| 2019/0187707 A1 | 6/2019 | Zheng et al. |
| 2019/0187708 A1 | 6/2019 | Zheng et al. |
| 2019/0235499 A1* | 8/2019 | Kazemi ............... B62D 15/025 |
| 2019/0248287 A1 | 8/2019 | Ono et al. |
| 2020/0041285 A1 | 2/2020 | Kato |
| 2020/0114923 A1 | 4/2020 | Kato |
| 2020/0189567 A1* | 6/2020 | Silver ................... B60W 10/20 |
| 2020/0192403 A1* | 6/2020 | Silver .................... G01S 17/95 |
| 2021/0132628 A1* | 5/2021 | Silver .................... G01S 13/867 |

FOREIGN PATENT DOCUMENTS

| | | |
|---|---|---|
| CN | 108137015 A | 6/2018 |
| DE | 102016215287 A1 | 2/2018 |
| JP | 2015535204 A | 12/2015 |
| JP | 2018535871 A | 12/2018 |
| KR | 20130058362 A | 6/2013 |
| KR | 101696821 B1 | 2/2017 |
| WO | 2013145015 A1 | 10/2013 |
| WO | 2014047250 A1 | 3/2014 |

OTHER PUBLICATIONS

International Search Report and Written Opinion for Application No. PCT/US2019/062985 dated Mar. 20, 2020.
Notice of Allowance for Korean Patent Application No. 10-2021-7021278, Dec. 21, 2021.
Office Action for Chinese Patent Application No. 201980083005.6, Apr. 20, 2022.
Office Action for Japanese Patent Application No. 2021-531304, Jan. 6, 2022.
The Extended European Search Report for European Patent Application No. 19895750.8, Oct. 13, 2022.
The First Office Action for Chinese Patent Application No. 201980083005.6, Dec. 6, 2021.
Translation of KR-101696821-B1 (Year: 2017).

(56) References Cited

OTHER PUBLICATIONS

Bento, et al., "Inter-Vehicle Sensor Fusion for Accurate Vehicle Localization Supported by V2V and V21 Communications", 15th International IEEE Conference on Intelligent Transportation Systems, Anchorage, Alaska, USA, Sep. 16-19, 2012, 8 pages.
Bojarski, et al., "End to End Learning for Self-Driving Cars", ArXiv:1604.07316v1, cs.CV, Apr. 25, 2016, 9 pages.
Borrelli, et al., "An MPG/Hybrid System Approach to Traction Control", IEEE Transactions on Control Systems Technology, vol. 14, No. 3, May 2006, pp. 541-552.
Falcone, et al., "Predictive Active Steering Control for Autonomous Vehicle Systems", IEEE Transactions on Control Systems Technology, vol. 15, No. 3, May 2007, pp. 566-580.
Hague, et al., "Ground based sensing systems for autonomous agricultural vehicles", Computers and Electronics in Agriculture, 2000, 18 pages.
Katrakazas, et al., "Real-time Motion Planning Methods for Autonomous On-road Driving: State-of-the-art and Future Research Directions", Transporation Research Part C 60, 2015, pp. 416-442.
Konolige, et al., "Outdoor Mapping and Navigation using Stereo Vision", In Proc. of Intl. Symp. on Experimental Robotics (ISER), Rio de Janeiro, Brazil, Jul. 2006, 12 pages.
Yoshida, et al., "Model Predictive Vehicle Control with Side Slip Angle Restriction with Suppression of Modeling Error by Sliding Mode Control", 2014 IEEE Conference on Control Applications (CCA) Part of 2014 IEEE Multi-conference on Systems and Control, Antibes, France, Oct. 8-10, 2014, 6 pages.

\* cited by examiner

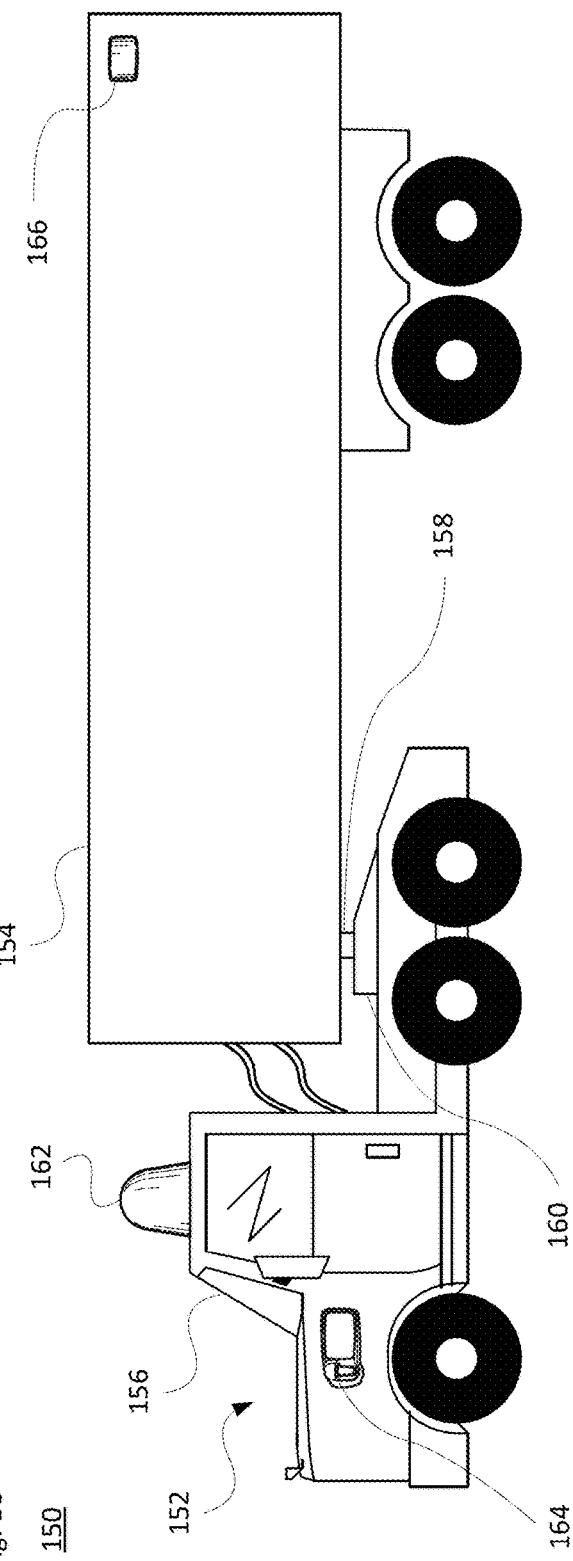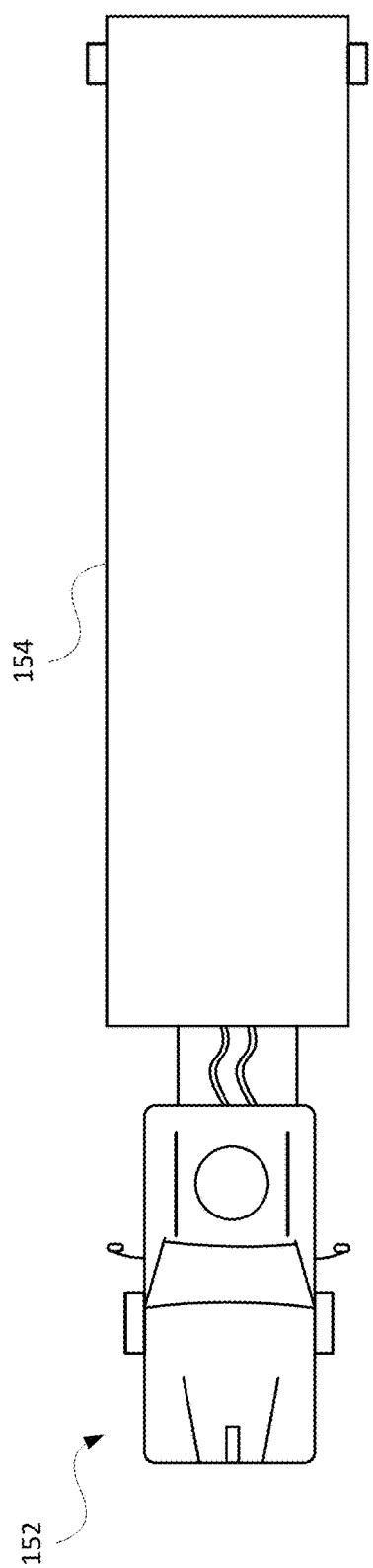

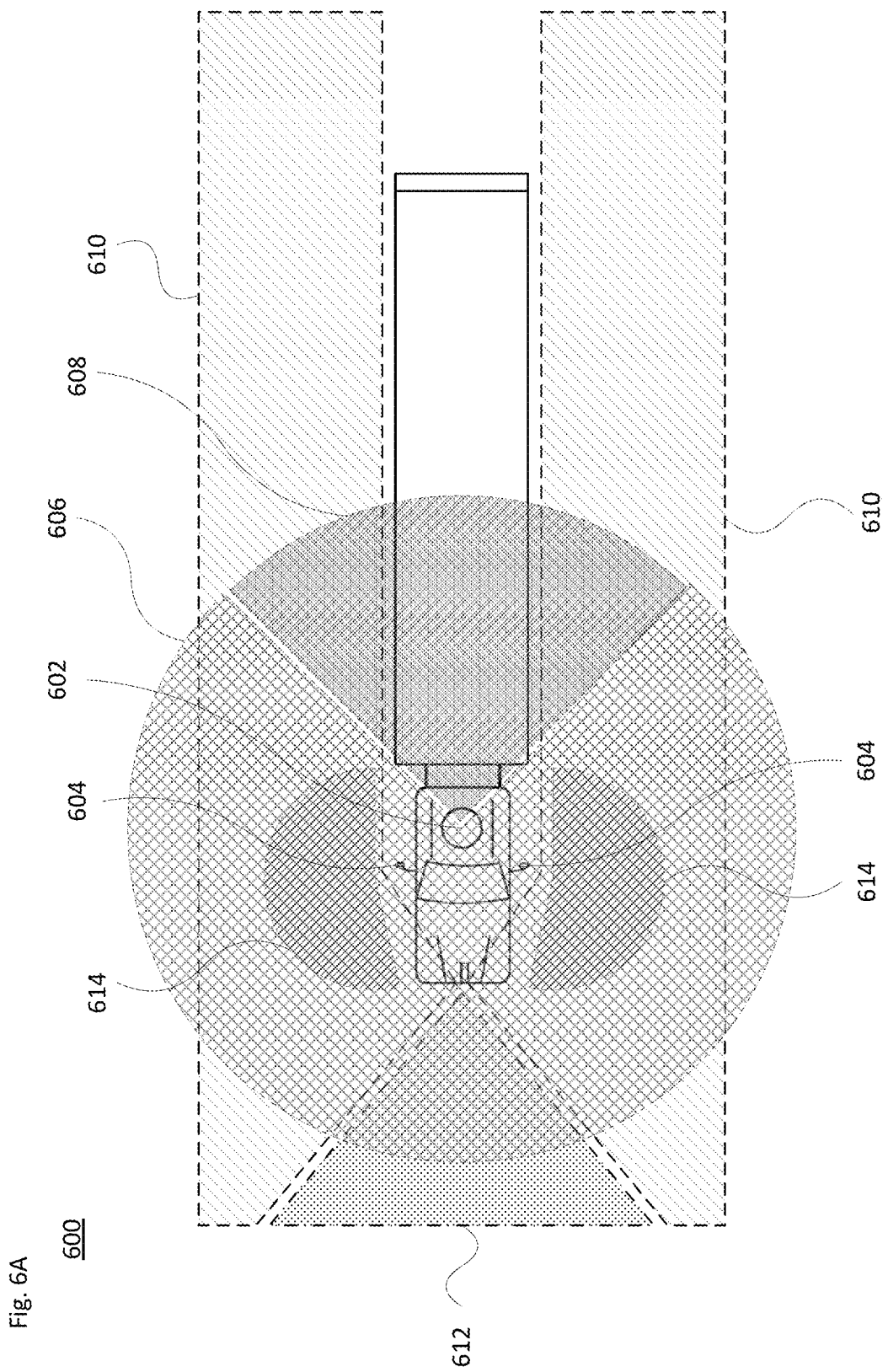

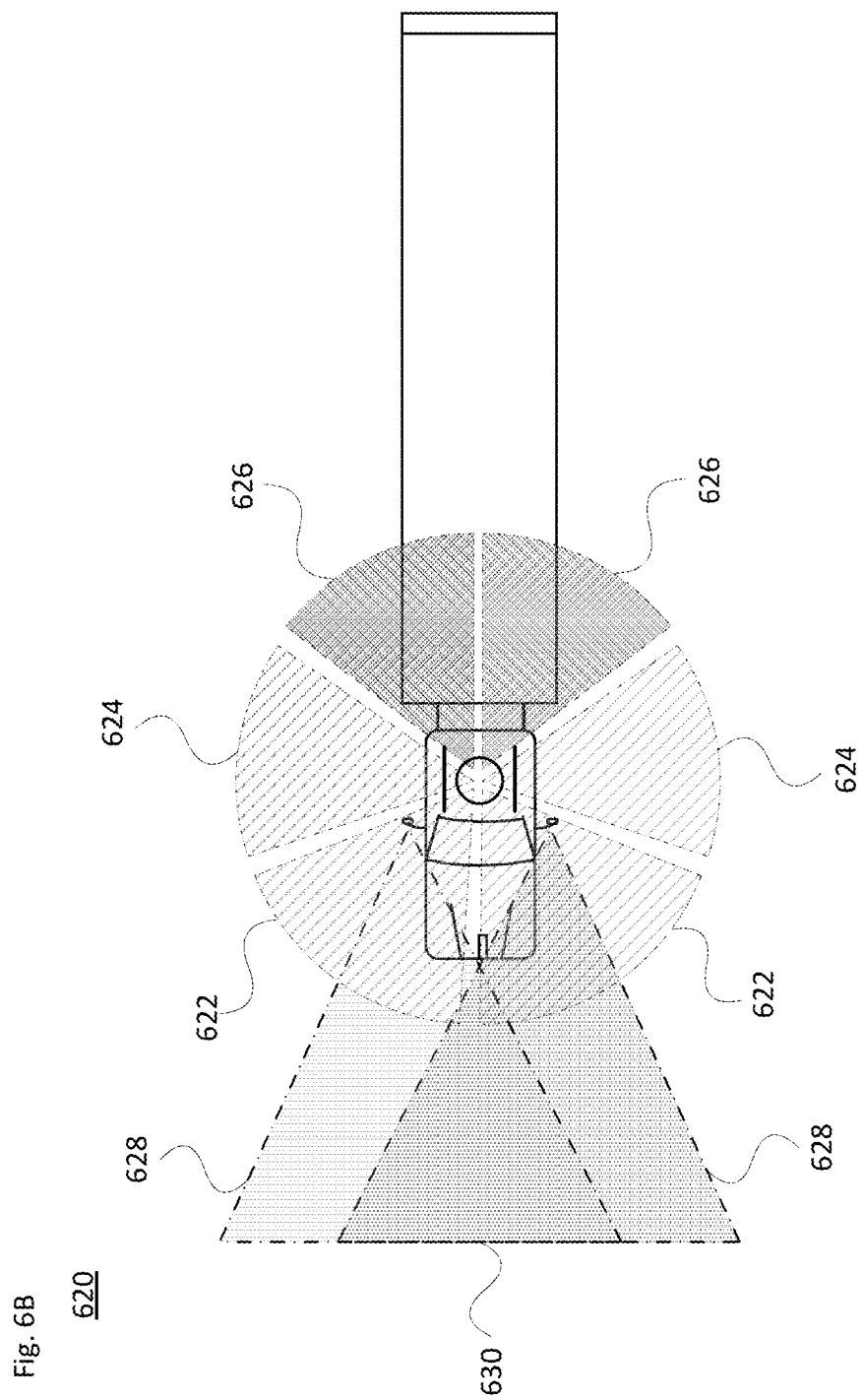

700

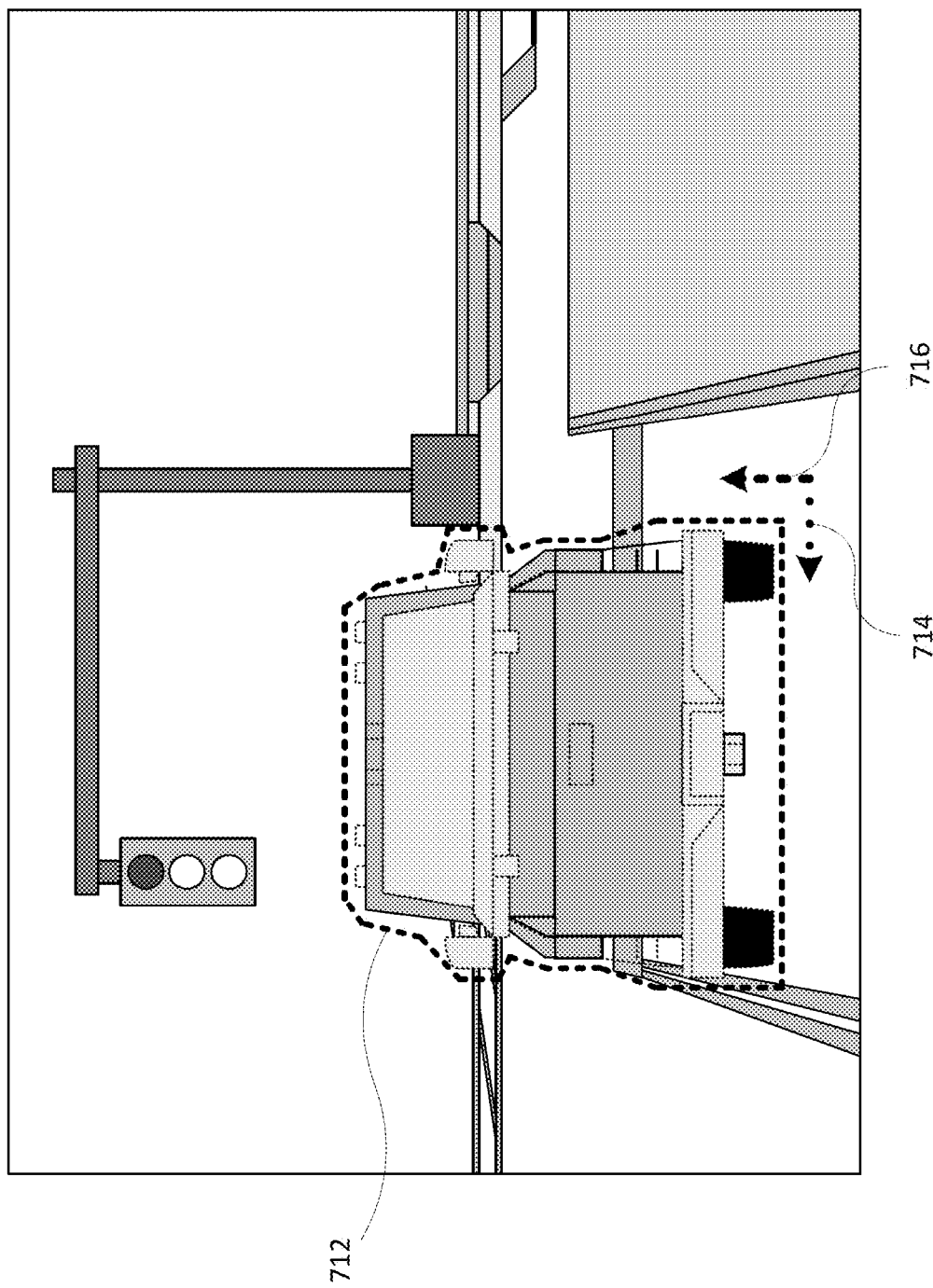

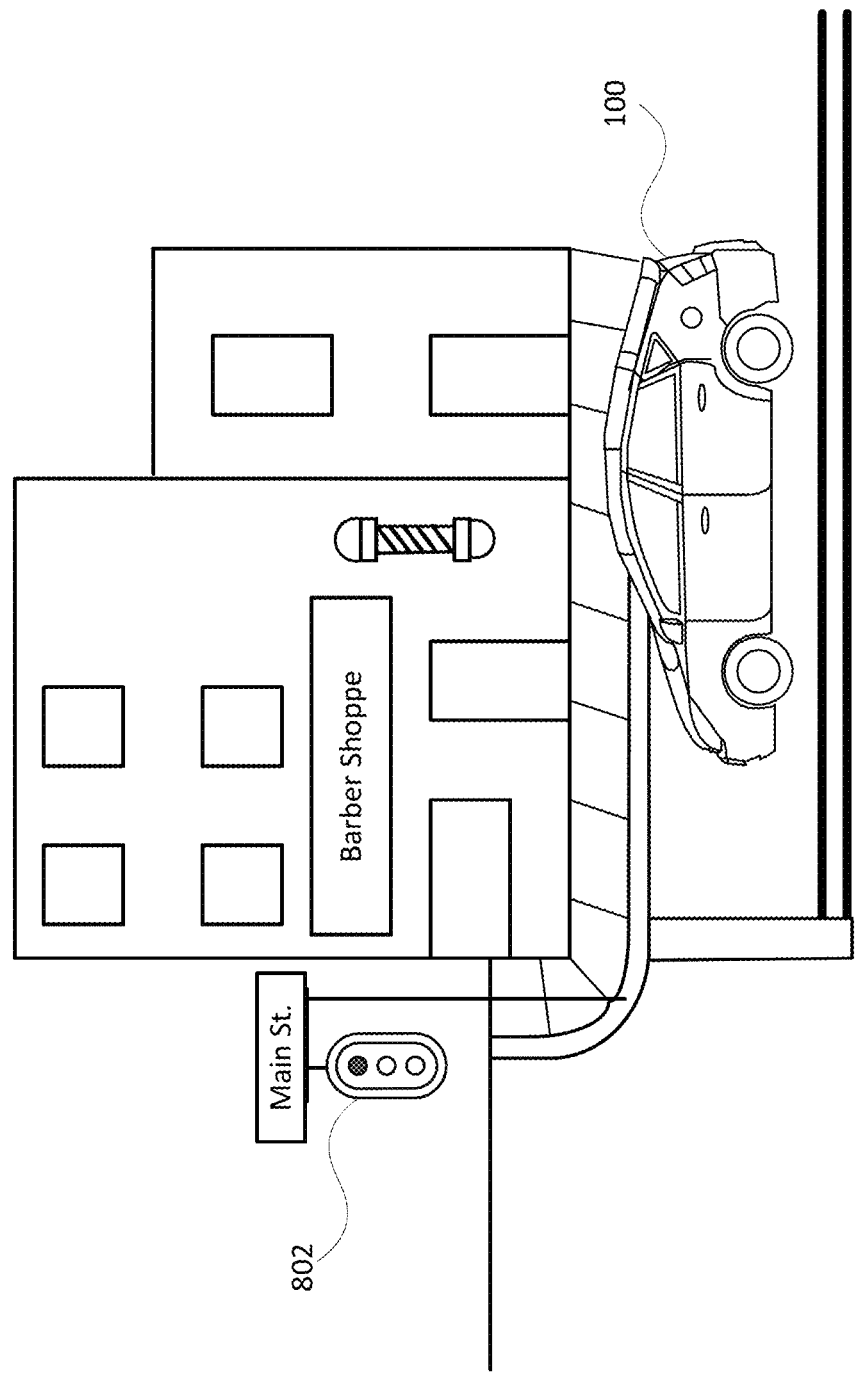

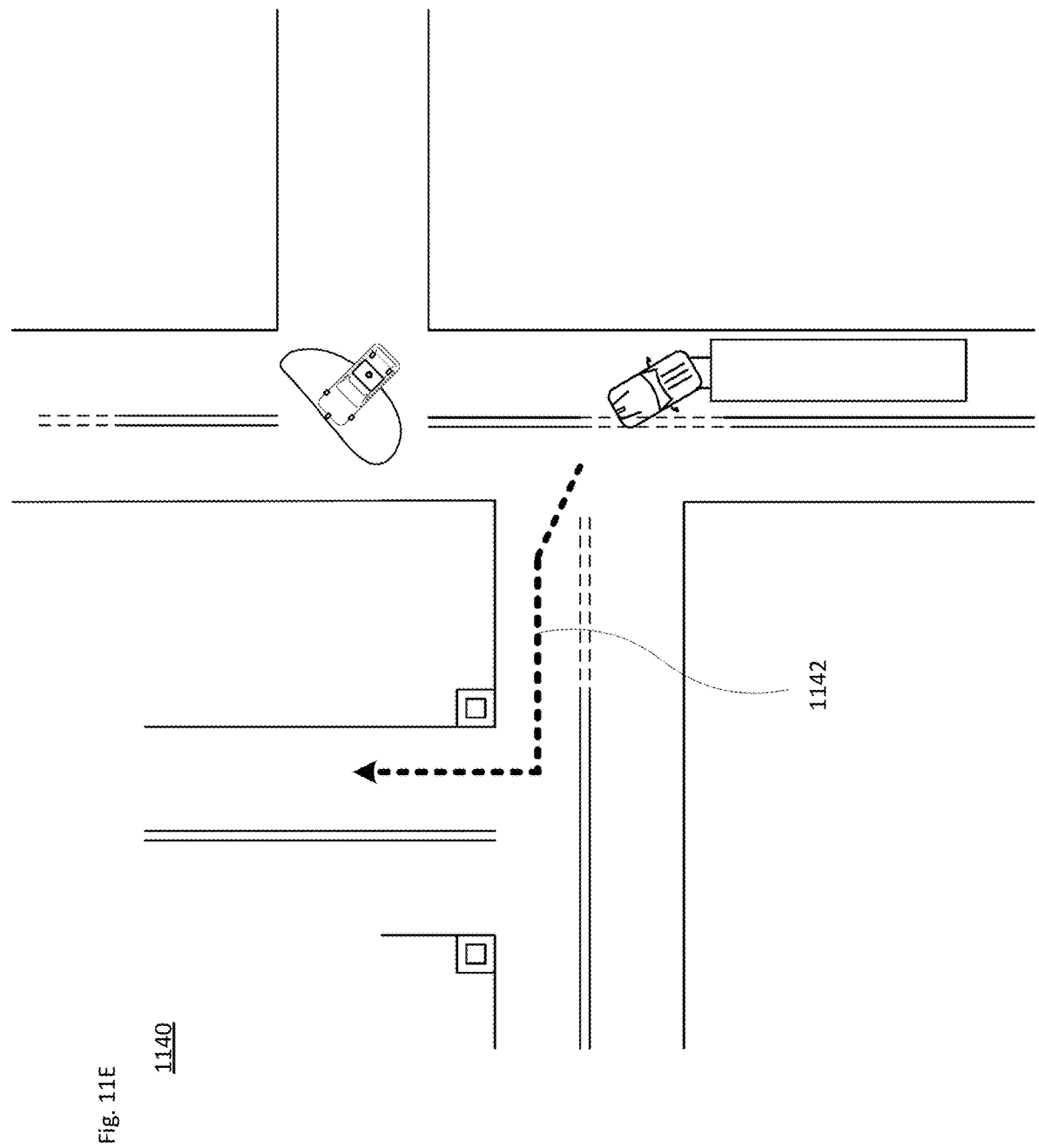

1210

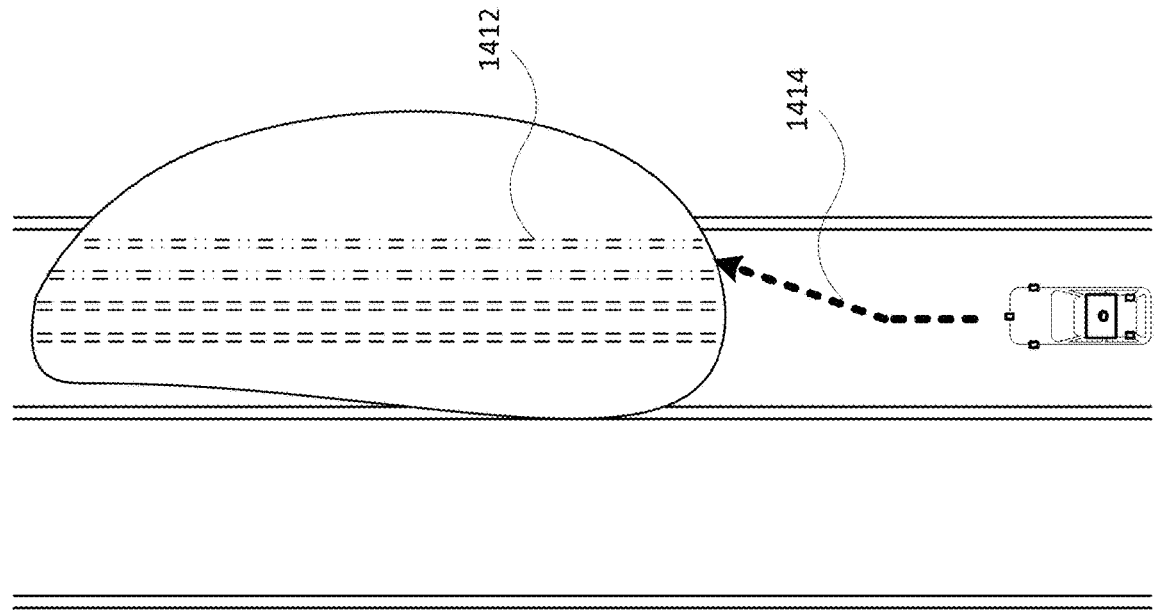
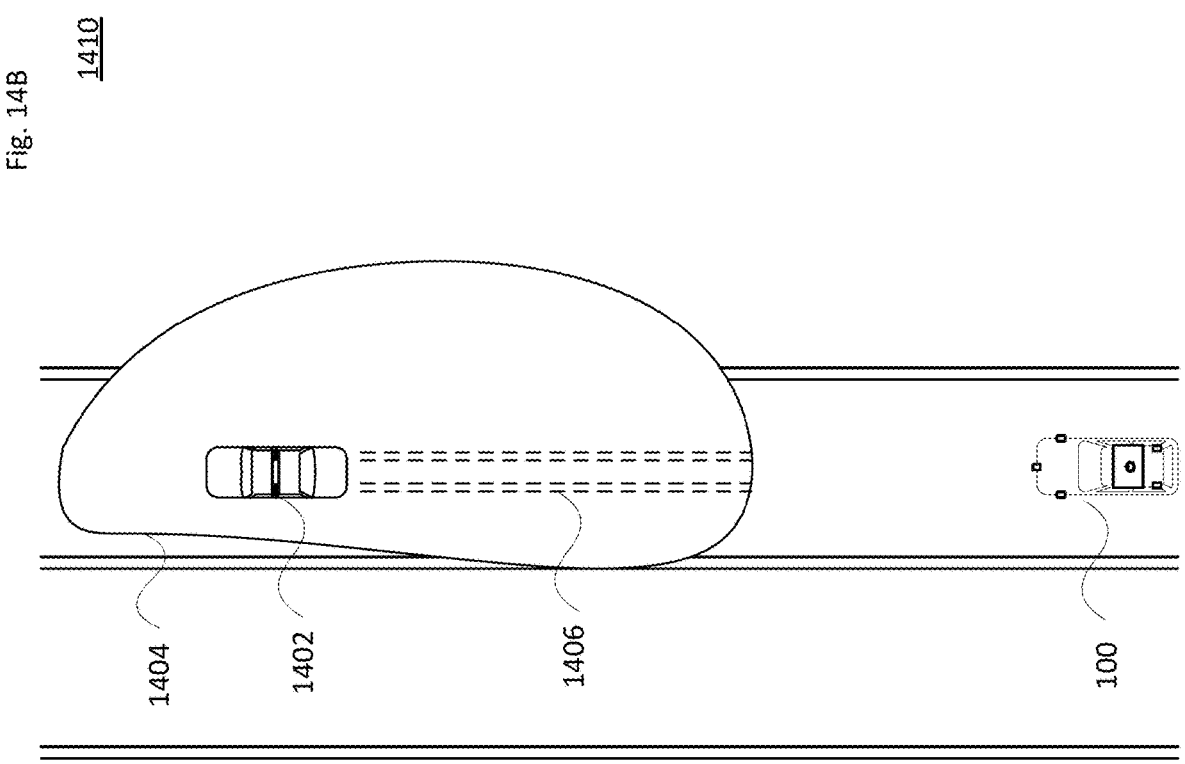

1700

DETECTING GENERAL ROAD WEATHER CONDITIONS

CROSS-REFERENCE TO RELATED APPLICATIONS

This application is a continuation of U.S. patent application Ser. No. 17/079,693, filed Oct. 26, 2020, which is a continuation of U.S. patent application Ser. No. 16/217,235, filed Dec. 12, 2018, now U.S. Pat. No. 10,852,746, which is related to U.S. application Ser. No. 16/217,531, entitled Determining Wheel Slippage on Self-Driving Vehicle, filed Dec. 12, 2018, now U.S. Pat. No. 10,940,851, the entire disclosures of which are incorporated by reference herein.

BACKGROUND

Autonomous vehicles, such as vehicles that do not require a human driver, can be used to aid in the transport of passengers or cargo from one location to another. Such vehicles may operate in a fully autonomous mode or a partially autonomous mode where a person may provide some driving input. In order to operate in an autonomous mode, the vehicle may employ various on-board sensors to detect features of the external environment, and use received sensor information to perform various driving operations. However, weather conditions in the vicinity of the vehicle may adversely impact the driving capabilities of the vehicle along the roadway. The sensors arranged to detect objects in the environment by themselves may not be capable of or lack the precision needed for the system to properly evaluate the potential impact of such weather conditions on how the vehicle operates.

BRIEF SUMMARY

The technology relates to determining general weather conditions affecting the roadway around a vehicle, and how that impacts driving for the vehicle when operating in an autonomous driving mode. This can include, for instance, determining whether the road is generally icy as opposed to an ice patch on a specific portion of the road surface. While the vehicle's perception system can detect conditions along upcoming areas via various sensors, the vehicle is also capable of gathering information about slippage, anti-lock braking, temperature measurement and other data. This aggregated information is analyzed by the on-board system and used to modify driving operations and/or re-route the vehicle.

According to aspects of the technology, a method of determining a weather or road condition in an environment around a vehicle operating in an autonomous driving mode is provided. The method comprises receiving, by one or more processors of the vehicle, sensor data of the environment around the vehicle from one or more sensors of the vehicle; causing, by the one or more processors, a subsystem of the vehicle to actuate one or more components of the subsystem during operation in the autonomous driving mode; obtaining pose information of the vehicle during the actuation of the one or more components of the subsystem; determining, by one or more processors of the vehicle, an actual pose of the vehicle according to the obtained pose information; comparing, by the one or more processors, the actual pose of the vehicle with an expected pose of the vehicle; determining, by the one or more processors, a difference between the actual pose and the expected pose based on the comparison; determining, according to at least one of the difference between the actual pose and the expected pose or the received sensor data of the external environment, that there is an adverse weather or road condition in the environment around the vehicle; and performing an action in response to determining the adverse weather or road condition in the environment around the vehicle.

Determining that there is an adverse weather or road condition may include determining that a region of a roadway on which the vehicle is operating is icy, wet or at least partially covered in snow.

Causing the subsystem of the vehicle to actuate the one or more components may include driving over a particular portion of roadway at a selected speed and a selected positional orientation to the particular portion of the roadway. This approach may further comprise instructing another vehicle to drive over the particular portion of roadway at a different selected speed or a different selected positional orientation to the particular portion of the roadway. In this scenario, the other vehicle may be a first vehicle, the vehicle is a second vehicle following the first vehicle, and the method includes the second vehicle observing results of the first vehicle driving over the particular portion of the roadway. Driving over the particular portion of roadway at the selected speed and the selected positional orientation may be done to detect an amount of traction along the particular portion of the roadway.

Obtaining the pose information may include receiving sensor data from the one or more sensors of the vehicle.

The method may further comprise detecting, by the one or more sensors of the vehicle, a driving action by one or more other vehicles in the environment around the vehicle. This may include, in response to detecting the driving action by the one or more other vehicles, the one or more processors determining a specific weather or road condition along a selected portion of roadway. The specific weather or road condition may be one of a puddle, an ice patch, or accumulated snow along the selected portion of the roadway. This approach may further comprise, in response to determining the specific weather or road condition along the selected portion of roadway, filtering out spurious sensor signals from a set of data obtained by one or more sensors of the vehicle.

The method may also comprise transmitting information regarding the corrective driving action, the route re-planning action, or the modification of the behavior prediction to at least one of another vehicle or a fleet management system.

In one example, a given one of the one or more components may a braking component and the subsystem may be a deceleration system. In another example, the given one of the one or more components may be an acceleration component and the subsystem may be an acceleration system. Or, in a further example, the given one of the one or more components may be a steering component and the subsystem may be a steering system.

Performing the action may include at least one of performing a corrective driving action, implementing a route re-planning action, causing a modification in a behavior prediction for an object in the environment, providing a notification to another vehicle, or providing a notification to a backend system.

According to other aspects of the technology, a vehicle is configured to operate in an autonomous driving mode. The vehicle comprises a driving system, a perception system, a positioning system and a control system. The driving system includes a steering subsystem, an acceleration subsystem and a deceleration subsystem to control driving of the vehicle in the autonomous driving mode. The perception system includes one or more sensors configured to detect objects in an environment external to the vehicle. The positioning system is configured to determine a current position of the vehicle. The control system includes one or more processors. The control system is operatively coupled to the driving system, the perception system and the positioning system. The control system is configured to receive sensor data of the environment around the vehicle from the one or more sensors, cause a subsystem of the vehicle to actuate one or more components of the subsystem during operation in the autonomous driving mode, obtain pose information of the vehicle during the actuation of the one or more components of the subsystem, determine an actual pose of the vehicle according to the obtained pose information, compare the actual pose of the vehicle with an expected pose of the vehicle, determine a difference between the actual pose and the expected pose based on the comparison, and determine, according to at least one of the difference between the actual pose and the expected pose or the received sensor data of the external environment, that there is an adverse weather or road condition in the environment around the vehicle. The control system is further configured to perform an action in response to determining the adverse weather or road condition in the environment around the vehicle.

The determination that there is an adverse weather or road condition may include determining that a region of a roadway on which the vehicle is operating is icy, wet or at least partially covered in snow.

The control system may be further configured to cause the subsystem of the vehicle to actuate the one or more components by driving over a particular portion of roadway at a selected speed and a selected positional orientation to the particular portion of the roadway.

In an example, the vehicle further comprises a communication system configured to communicate with at least one other vehicle. Here, the control system is further configured to instruct the at least one other vehicle to drive over the particular portion of roadway at a different selected speed or a different selected positional orientation to the particular portion of the roadway via the communication system. According to one scenario, the at least one other vehicle may be a first vehicle, the vehicle may be a second vehicle following the first vehicle, and the one or more sensors of the perception system are configured to observe results of the first vehicle driving over the particular portion of the roadway.

In a further example, the one or more sensors are configured to detect a driving action by one or more other vehicles in the environment around the vehicle. In response to detecting the driving action by the one or more other vehicles, the control system is configured to determine a specific weather or road condition along a selected portion of roadway and/or filter out spurious sensor signals from a set of data obtained by one or more sensors of the vehicle.

The vehicle may further comprise a communication system configured to transmit information regarding the corrective driving action, the route re-planning action, or the modification of the behavior prediction to at least one of another vehicle or a fleet management system.

The control system may also be configured to perform the action by at least one of initiating a corrective driving action, implementing a route re-planning action, causing a modification in a behavior prediction for an object in the environment, providing a notification to another vehicle, or providing a notification to a backend system.

BRIEF DESCRIPTION OF THE DRAWINGS

FIGS. 1C-D illustrate an example cargo-type vehicle configured for use with aspects of the technology.

FIGS. 6A-B illustrate example sensor fields of view for a cargo-type vehicle in accordance with aspects of the disclosure.

FIGS. 7A-D illustrate an example braking scenario in accordance with aspects of the technology.

FIGS. 8A-D illustrate an example acceleration scenario in accordance with aspects of the technology.

FIGS. 11D-E illustrate an example of route re-planning in accordance with aspects of the technology.

FIGS. 14A-B illustrate an example of lateral offset testing in accordance with aspects of the technology.

DETAILED DESCRIPTION

Aspects of the technology gather information from on-board sensors and from evaluation of specific driving actions taken by the vehicle and/or other nearby vehicles. The information is aggregated and analyzed in order for the on-board computer system to estimate what portion(s) of the road is wet, icy or otherwise slippery (e.g., has reduced traction) than other portions of the road. As a result, the computer system's planner or other subsystem is able to identify particular behaviors, responses and/or operational models. In one scenario, this can include reserving some amount of braking power to address the general road condition, and use this when planning a trajectory for the vehicle. As a result, the system can detect and respond to different levels of adverse weather conditions, including a light amount of snow that covers the lane lines, or several inches (or more) of snow that effectively narrows a lane or closes a lane or the shoulder (in contrast to what is indicated in a previously obtained map of the area). Here, the system may determine whether these conditions are temporary changes due to the adverse weather conditions and adjust the planning accordingly.

Example Vehicle Systems

Figure 1A:
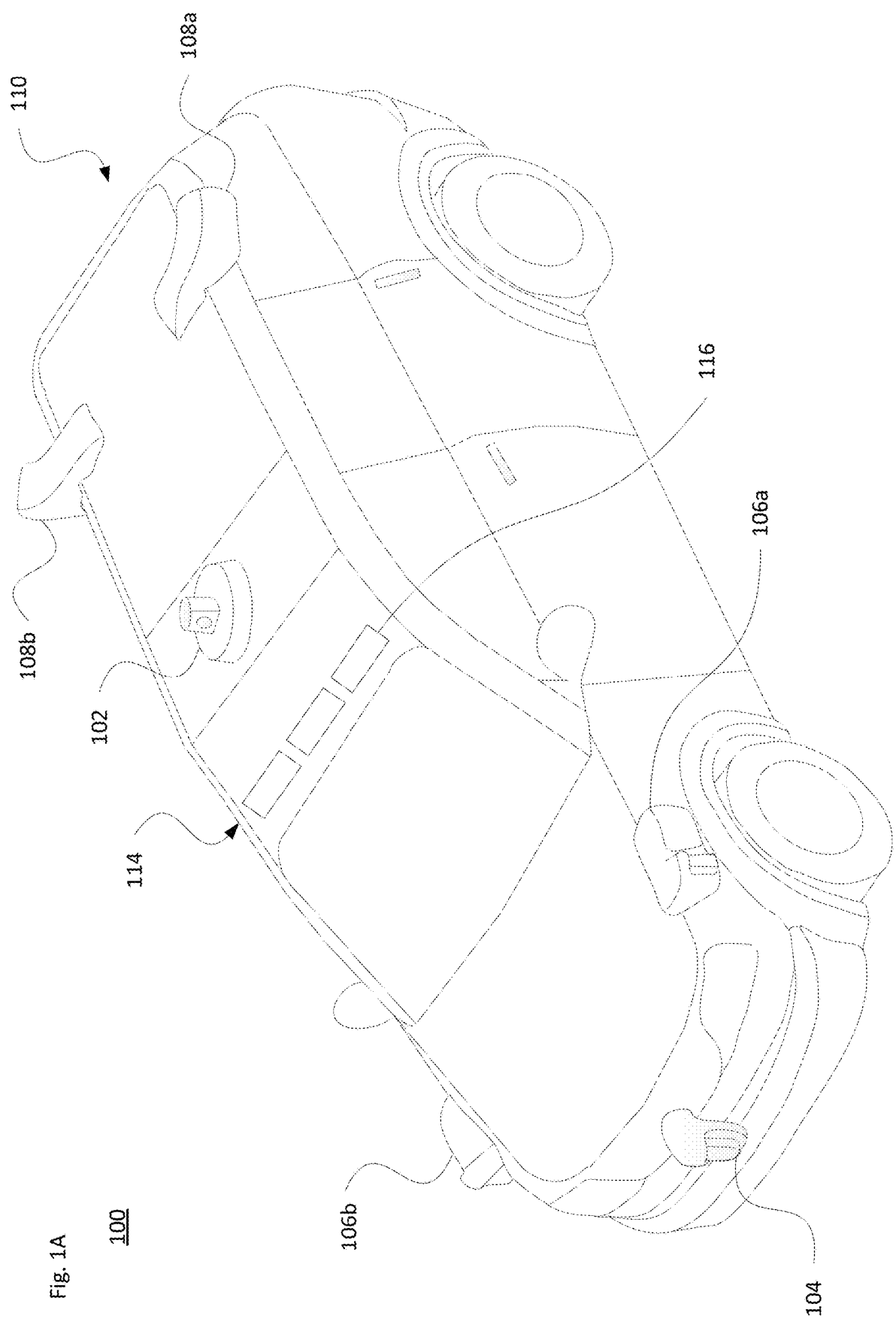
FIGS. 1A-B illustrate an example passenger-type vehicle configured for use with aspects of the technology.
Figure 1B:
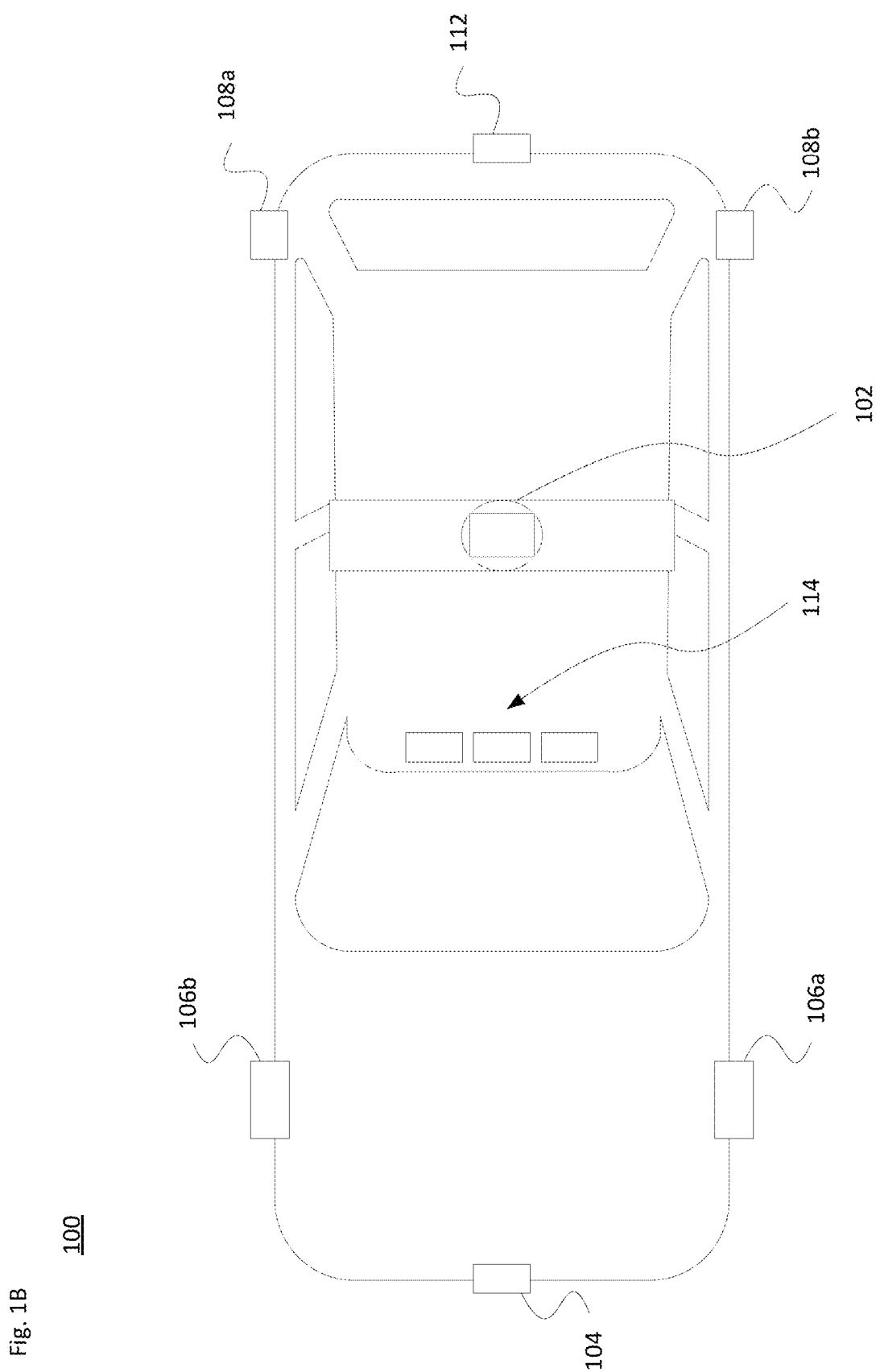

FIG. 1A illustrates a perspective view of an example passenger vehicle 100, such as a minivan, sport utility vehicle (SUV) or other vehicle. FIG. 1B illustrates a top-down view of the passenger vehicle 100. The passenger vehicle 100 may include various sensors for obtaining information about the vehicle's external environment. For instance, a roof-top housing 102 may include a Lidar sensor as well as various cameras, radar units, infrared and/or acoustical sensors. Housing 104, located at the front end of vehicle 100, and housings 106*a*, 106*b* on the driver's and passenger's sides of the vehicle may each incorporate Lidar, radar, camera and/or other sensors. For example, housing 106*a* may be located in front of the driver's side door along a quarter panel of the vehicle. As shown, the passenger vehicle 100 also includes housings 108*a*, 108*b* for radar units, Lidar and/or cameras also located towards the rear roof portion of the vehicle. Additional Lidar, radar units and/or cameras (not shown) may be located at other places along the vehicle 100. For instance, arrow 110 indicates that a sensor unit (112 in FIG. 1B) may be positioned along the rear of the vehicle 100, such as on or adjacent to the bumper. And arrow 114 indicates a series of sensor units 116 arranged along a forward-facing direction of the vehicle. In some examples, the passenger vehicle 100 also may include various sensors for obtaining information about the vehicle's interior spaces (not shown).

FIGS. 1C-D illustrate an example cargo vehicle 150, such as a tractor-trailer truck. The truck may include, e.g., a single, double or triple trailer, or may be another medium or heavy duty truck such as in commercial weight classes 4 through 8. As shown, the truck includes a tractor unit 152 and a single cargo unit or trailer 154. The trailer 154 may be fully enclosed, open such as a flat bed, or partially open depending on the type of cargo to be transported. In this example, the tractor unit 152 includes the engine and steering systems (not shown) and a cab 156 for a driver and any passengers. In a fully autonomous arrangement, the cab 156 may not be equipped with seats or manual driving components, since no person may be necessary.

The trailer 154 includes a hitching point, known as a kingpin, 158. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 162, 164 disposed therealong. For instance, one or more sensor units 162 may be disposed on a roof or top portion of the cab 156, and one or more side sensor units 164 may be disposed on left and/or right sides of the cab 156. Sensor units may also be located along other regions of the cab 106, such as along the front bumper or hood area, in the rear of the cab, adjacent to the fifth-wheel, underneath the chassis, etc. The trailer 154 may also have one or more sensor units 166 disposed therealong, for instance along a side panel, front, rear, roof and/or undercarriage of the trailer 154.

By way of example, each sensor unit may include one or more sensors, such as Lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be any type of vehicle including, but not limited to, cars, trucks, motorcycles, buses, recreational vehicles, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
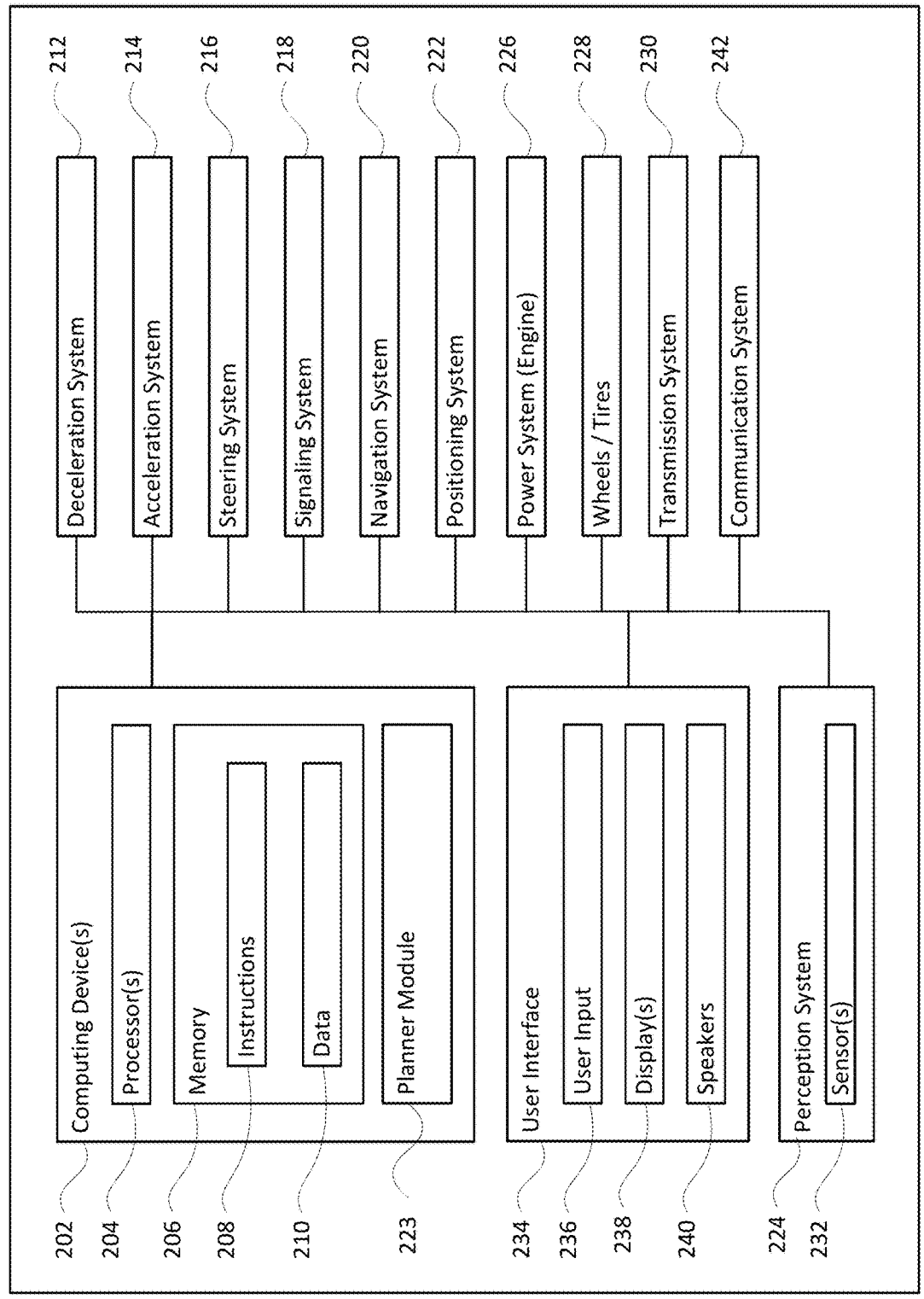
FIG. 2 is a block diagram of systems of an example passenger-type vehicle in accordance with aspects of the technology.

FIG. 2 illustrates a block diagram 200 with various components and systems of an exemplary vehicle, such as passenger vehicle 100, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module 223, in accordance with the navigation system 220, the positioning system 222 and/or other components of the system, e.g., for determining a route from a starting point to a destination or for making modifications to various driving aspects in view of current or expected traction conditions.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, trees, etc. The sensors may 232 may also detect certain aspects of weather conditions, such as snow, rain or water spray, or puddles, ice or other materials on the roadway.

By way of example only, the perception system 224 may include one or more light detection and ranging (Lidar) sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc. The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Still further sensors 232 of the perception system 224 may measure the rate of rotation of the wheels 228, an amount or a type of braking by the deceleration system 312, and other factors associated with the equipment of the vehicle itself.

The raw data from the sensors and the aforementioned characteristics can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223. In addition, the computing devices 202 may perform calibration of individual sensors, all sensors in a particular sensor assembly, or between sensors in different sensor assemblies or other physical housings.

As illustrated in FIGS. 1A-B, certain sensors of the perception system 224 may be incorporated into one or more sensor assemblies or housings. In one example, these may be integrated into the side-view mirrors on the vehicle. In another example, other sensors may be part of the roof-top housing 102, or other sensor housings or units 106a,b, 108a,b, 112 and/or 116. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle.

The passenger vehicle also includes a communication system 242. For instance, the communication system 242 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
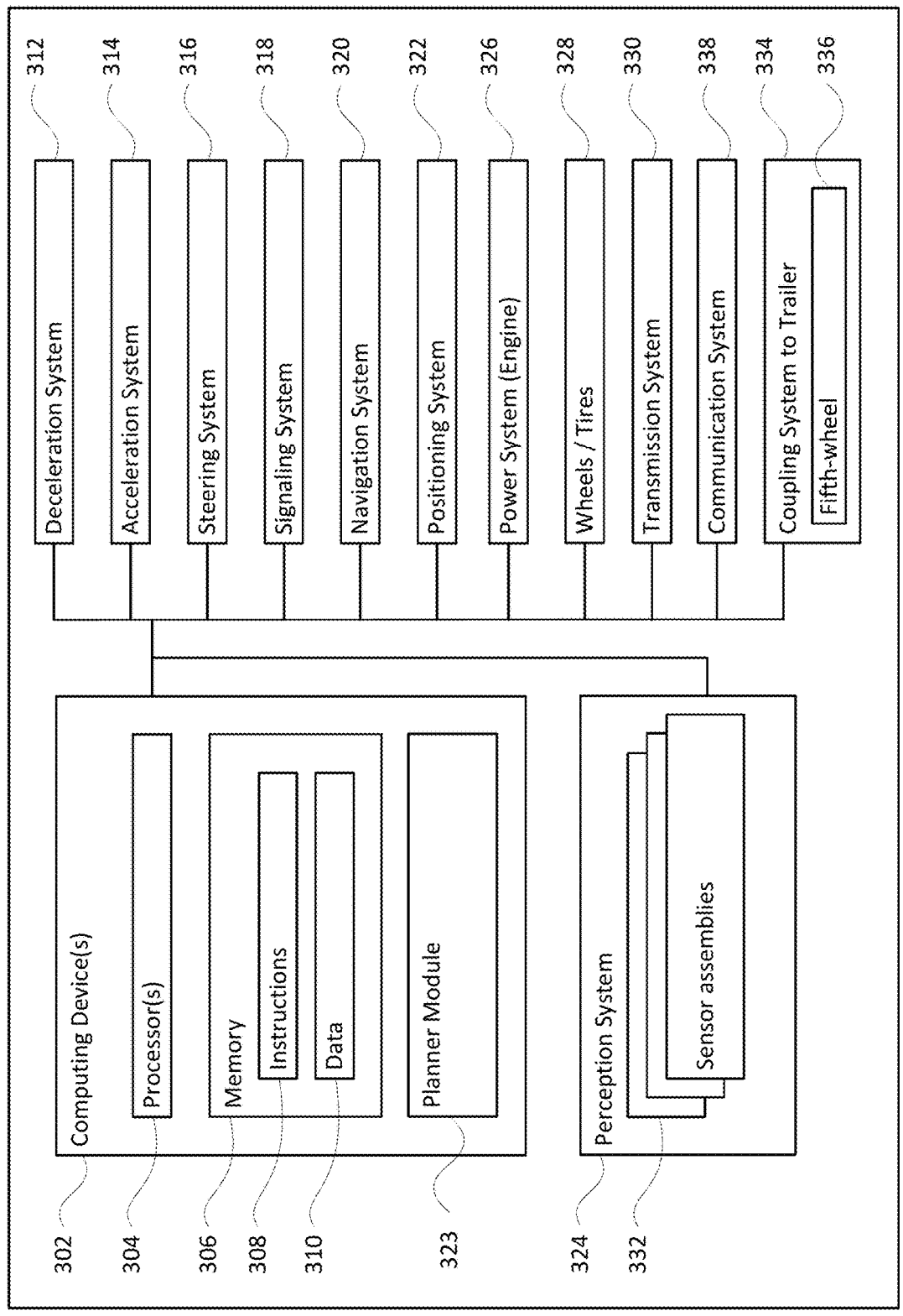
FIGS. 3A-B are block diagrams of systems of an example cargo-type vehicle in accordance with aspects of the technology.

FIG. 3A illustrates a block diagram 300 with various components and systems of a vehicle, e.g., vehicle 150 of FIG. 1C. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form an autonomous driving computing system incorporated into vehicle 150. Similar to the arrangement discussed above regarding FIG. 2, the autonomous driving computing system of block diagram 300 may capable of communicating with various components of the vehicle in order to perform route planning and driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 228 are coupled to the transmission system 230, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information and navigation system 320. Computing devices 302 may employ a planner module 323, in conjunction with the positioning system 322, the perception system 324 and other subsystems to detect and respond to objects when needed to reach the location safely, similar to the manner described above for FIG. 2.

Similar to perception system 224, the perception system 324 also includes one or more sensors or other components such as those described above for detecting objects external to the vehicle, objects or conditions internal to the vehicle, and/or operation of certain vehicle equipment such as the wheels and deceleration system 312. For instance, as indicated in FIG. 3A the perception system 324 includes one or more sensor assemblies 332. Each sensor assembly 232 includes one or more sensors. In one example, the sensor assemblies 332 may be arranged as sensor towers integrated into the side-view mirrors on the truck, farm equipment, construction equipment or the like. Sensor assemblies 332 may also be positioned at different locations on the tractor unit 152 or on the trailer 154, as noted above with regard to FIGS. 1C-D. The computing devices 302 may communicate with the sensor assemblies located on both the tractor unit 152 and the trailer 154. Each assembly may have one or more types of sensors such as those described above.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300.

Figure 3B:
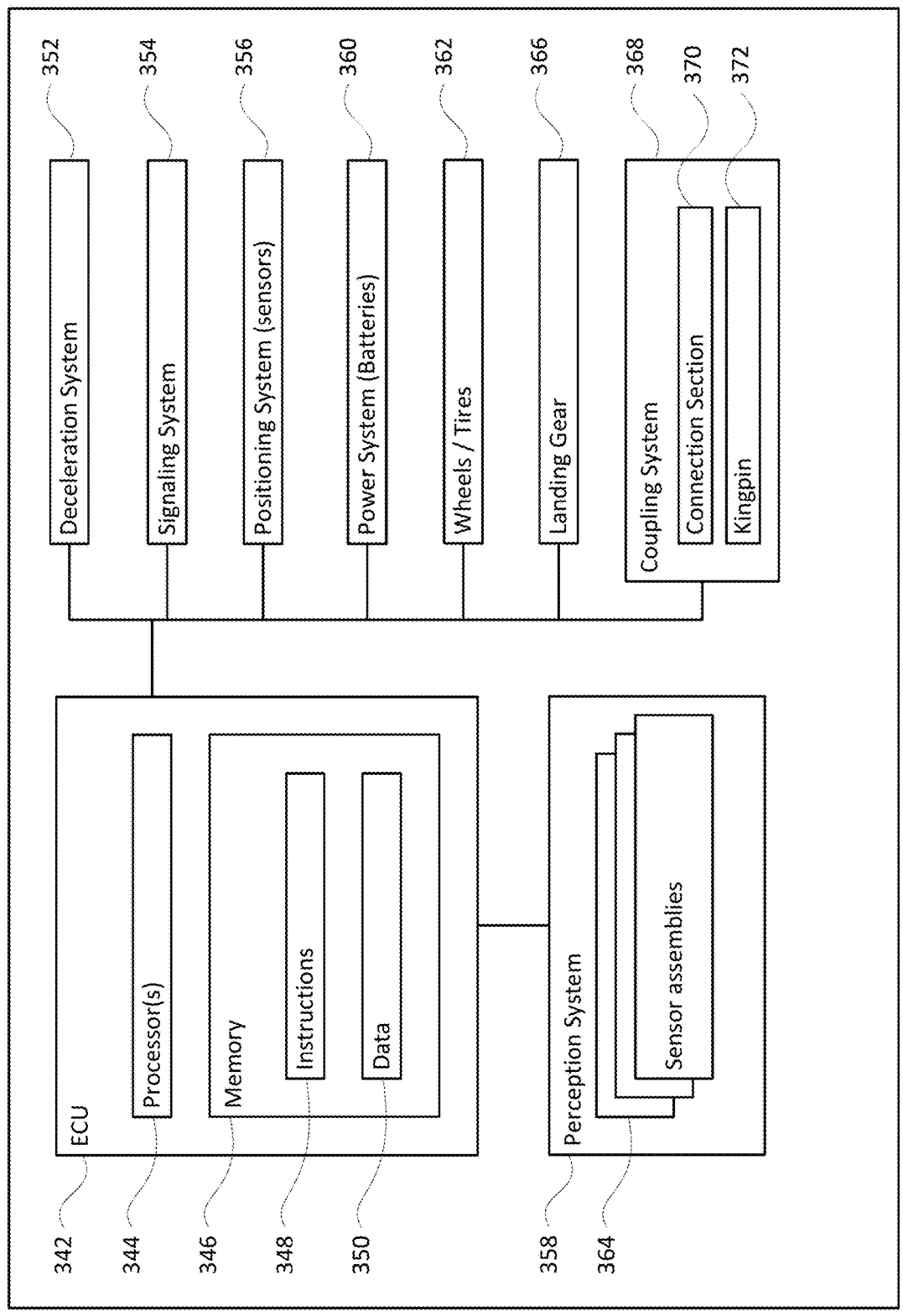

FIG. 3B illustrates an example block diagram 340 of systems of the trailer, such as trailer 154 of FIGS. 1C-D. As shown, the system includes an ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The ECU 342 is configured to receive information and control signals from the trailer unit. The on-board processors 344 of the ECU 342 may communicate with various systems of the trailer, including a deceleration system 352, signaling system 254, and a positioning system 356. The ECU 342 may also be operatively coupled to a perception system 358 with one or more sensors for detecting objects in the trailer's environment and a power system 260 (for example, a battery power supply) to provide power to local components. Some or all of the wheels/tires 362 of the trailer may be coupled to the deceleration system 352, and the processors 344 may be able to receive information about tire pressure, balance, wheel speed and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear provide a support structure for the trailer when decoupled from the tractor unit. The coupling system 368, which may be a part of coupling system 334, provides connectivity between the trailer and the tractor unit. Thus, the coupling system 368 may include a connection section 370 (e.g., for power and/or pneumatic links). The coupling system also includes a kingpin 372 configured for connectivity with the fifth-wheel of the tractor unit.

Example Implementations

In view of the structures and configurations described above and illustrated in the figures, various aspects will now be described in accordance with aspects of the technology.

Figure 4:
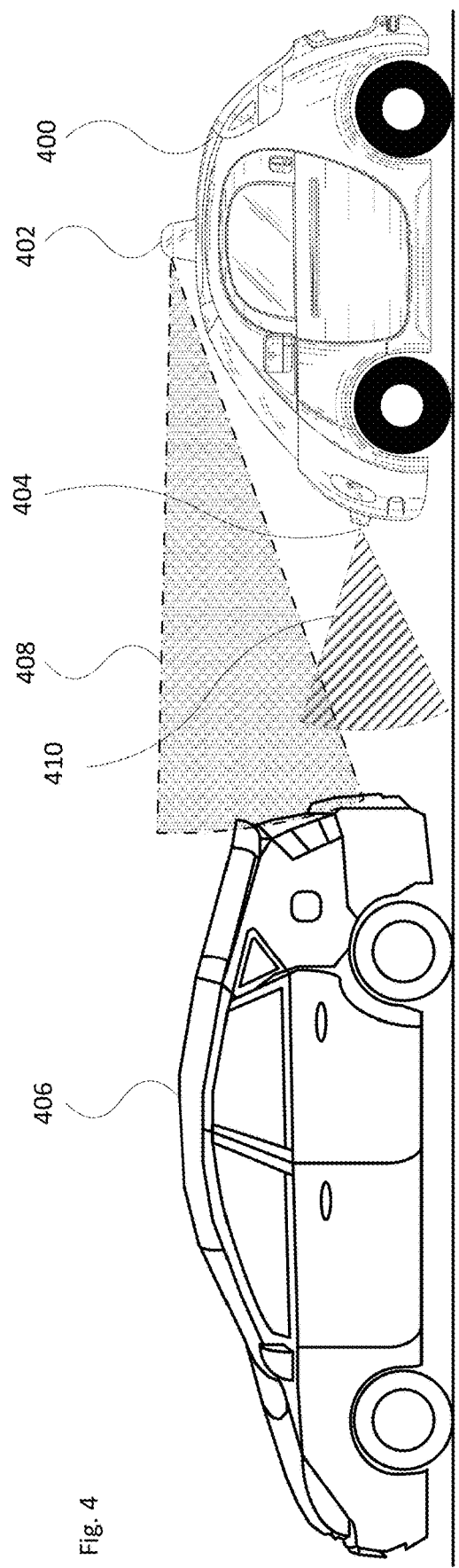
FIG. 4 illustrates an example of detecting an object in a sensor field of view in accordance with aspects of the technology.

FIG. 4 illustrates a scenario in which vehicle 400 uses sensors 402 and 404 to detect the presence of another vehicle 406. As shown, sensors 402 and 404 have respective fields of view (FOV) 408 and 410 to detect objects in front of vehicle 400. In this example, the sensors 402 and 404 may be, e.g., Lidar, radar, image and/or acoustical sensors.

Various sensors may be located at different places around the vehicle (see FIGS. 1A-D) to gather data from different parts of the external environment. Certain sensors may have different fields of view depending on their placement around the vehicle and the type of information they are designed to gather. For instance, different Lidar sensors may be used for near (short range) detection of objects adjacent to the vehicle (e.g., less than 2-10 meters), while others may be used for far (long range) detection of objects a hundred meters (or more or less) in front of the vehicle. Mid-range Lidars may also be employed. Multiple radar units may be positioned toward the front or rear of the vehicle for long-range object detection. And cameras may be arranged to provide good visibility around the vehicle. Depending on the configuration, certain types of sensors may include multiple individual sensors with overlapping fields of view. Alternatively, other sensors may provide redundant 360° fields of view.

Figure 5:
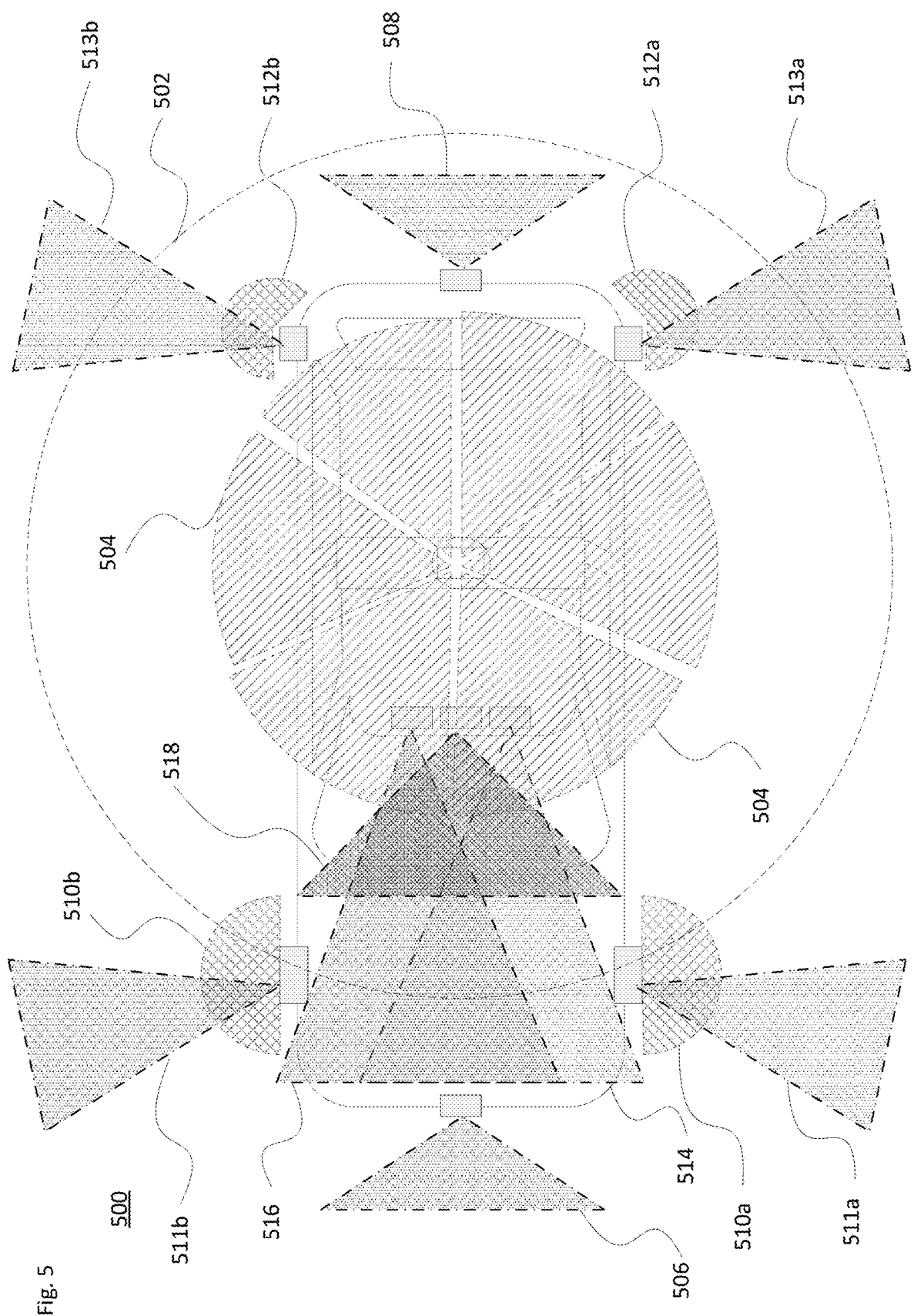
FIG. 5 illustrates example sensor fields of view for a passenger-type vehicle in accordance with aspects of the disclosure.

FIG. 5 provides one example 500 of sensor fields of view relating to the sensors illustrated in FIG. 1B. Here, should the roof-top housing 102 include a Lidar sensor as well as various cameras, radar units, infrared and/or acoustical sensors, each of those sensors may have a different field of view. Thus, as shown, the Lidar sensor may provide a 360° FOV 502, while cameras arranged within the housing 102 may have individual FOVs 504. A sensor within housing 104 at the front end of the vehicle has a forward facing FOV 506, while a sensor within housing 112 at the rear end has a rearward facing FOV 508. The housings 106a, 106b on the driver's and passenger's sides of the vehicle may each incorporate Lidar, radar, camera and/or other sensors. For instance, Lidars within housings 106a and 106b may have a respective FOV 510a or 510b, while radar units or other sensors within housings 106a and 106b may have a respective FOV 511a or 511b. Similarly, sensors within housings 108a, 108b located towards the rear roof portion of the vehicle each have a respective FOV. For instance, Lidars within housings 108a and 108b may have a respective FOV 512a or 512b, while radar units or other sensors within housings 108a and 108b may have a respective FOV 513a or 513b. And the series of sensor units 116 arranged along a forward-facing direction of the vehicle may have respective FOVs 514, 516 and 518. Each of these fields of view is merely exemplary and not to scale in terms of coverage range.

Examples of Lidar, camera and radar sensors and their fields of view for a cargo-type vehicle (e.g., vehicle 150 of FIGS. 1C-D) are shown in FIGS. 6A and 6B. In example 600 of FIG. 6A, one or more Lidar units may be located in rooftop sensor housing 602, with other Lidar units in side sensor housings 604. In particular, the rooftop sensor housing 602 may be configured to provide a 360° FOV. A pair of sensor housings 604 may be located on either side of the tractor unit cab, for instance integrated into a side view mirror assembly or along a side door or quarter panel of the cab. In one scenario, long range Lidars may be located along a top or upper area of the sensor housings 602 and 604. The long range Lidar may be configured to see over the hood of the vehicle. And short range Lidars may be located in other portions of the sensor housings 602 and 604. The short range Lidars may be used by the perception system to determine whether an object such as another vehicle, pedestrian, bicyclist, etc. is next to the front or side of the vehicle and take that information into account when determining how to drive or turn. Both types of Lidars may be co-located in the housing, for instance aligned along a common vertical axis.

As illustrated in FIG. 6A, the Lidar(s) in the rooftop sensor housing 602 may have a FOV 606. Here, as shown by region 608, the trailer or other articulating portion of the vehicle may provide signal returns, and may partially or fully block a rearward view of the external environment. Long range Lidars on the left and right sides of the tractor unit have FOV 610. These can encompass significant areas along the sides and front of the vehicle. As shown, there may be an overlap region 612 of their fields of view in front of the vehicle. The overlap region 612 provides the perception system with additional or information about a very important region that is directly in front of the tractor unit. This redundancy also has a safety aspect. Should one of the long range Lidar sensors suffer degradation in performance, the redundancy would still allow for operation in an autonomous mode. Short range Lidars on the left and right sides have smaller FOV 614. A space is shown between different fields of view for clarity in the drawing; however in actuality there may be no break in the coverage. The specific placements of the sensor assemblies and fields of view is merely exemplary, and may be different depending on, e.g., the type of vehicle, the size of the vehicle, FOV requirements, etc.

FIG. 6B illustrates an example configuration 620 for either (or both) of radar and camera sensors in a rooftop housing and on both sides of a tractor-trailer, such as vehicle 150 of FIGS. 1C-D. Here, there may be multiple radar and/or camera sensors in each of the sensor housings 602 and 604 of FIG. 6A. As shown, there may be sensors in the rooftop housing with front FOV 622, side FOV 624 and rear FOV 626. As with region 608, the trailer may impact the ability of the sensor to detect objects behind the vehicle. Sensors in the sensor housings 604 may have forward facing FOV 628 (and side and/or rear fields of view as well). As with the Lidars discussed above with respect to FIG. 6A, the sensors of FIG. 6B may be arranged so that the adjoining fields of view overlap, such as shown by overlapping region 630. The overlap regions here similarly can provide redundancy and have the same benefits should one sensor suffer degradation in performance.

Example Scenarios

According to aspects of the technology, determining the general road weather conditions around the vehicle may involve the vehicle performing one or more braking and/or acceleration operations during autonomous driving. Such operations may be performed in conjunction with gathering data from Lidar, radar, camera or other sensors configured to detect objects in the external environment. Once the general weather condition information has been determined, it may be used to manage or alter current driving operations. It may also be used to modify or re-plan an upcoming portion of the route.

The braking and acceleration operations may be conducted in different ways. For instance, as discussed below, the vehicle may be controlled to operate in a specific manner during predefined scenarios, which may include one or more braking and/or acceleration operations along a particular portion of the roadway. This may be considered an active testing approach. Or, alternatively or in conjunction with the active approach, the system may gather weather condition information during different driving activities, for instance as part of an ongoing driving event (e.g., braking around a curve, accelerating from a standstill, etc.). This may be considered a passive testing approach.

By way of example, in one active testing scenario when the vehicle is driving along a straight pathway or otherwise constant trajectory and there are no other nearby vehicles or other objects, the system may initiate braking or increase a braking level until feedback from the deceleration system (e.g., ABS braking component) indicates that the wheels are starting to lose traction with the road surface. This includes applying the brakes one or more times for a selected period of time (e.g., 0.1-2.0 seconds, or more or less). A loss of traction may be due to various environmental conditions, such as ice, snow or puddles on the road surface. It may also be due to grease, oil or other liquids or debris that is on the roadway.

For this type of active testing scenario, the limitation regarding nearby vehicles or other objects may focus on objects behind the vehicle. For instance, the system may require a minimum amount of headway with a trailing vehicle (the time, based on current rates of speed, between the vehicle and any trailing vehicles) before initiating a brake test. In this case, a minimum amount of time may be, e.g., 3-5 seconds or more. Alternatively, the system may set a minimum distance threshold of, e.g., 30-80 meters, or more.

In another active testing scenario, the vehicle may select an amount of acceleration from a standstill. This may occur, by way of example, at a stop sign or stop light. The system may also initiate acceleration from a first speed to a second speed (e.g., from 20 mph to 25 mph). Once the vehicle begins to accelerate from a standstill or increase the speed, the system may detect whether the tires are spinning. Depending on the conditions, this type of situation may also be easier or harder to regain control if slippage occurs than in the first active testing scenario.

One example of a passive testing scenario occurs when the vehicle slows down during a typical driving procedure, such as to brake for a red light or upcoming stop sign. Another example of a passive testing scenario would be slowing down during a turning operation. In either case, the system may detect the performance of the tires (e.g., slippage, time or distance to full stop, ability to closely follow a trajectory during a turn at normal turning speed) during the passive testing scenario, using techniques described herein.

In any of the active or passive scenarios, one or more braking and/or acceleration actions may be performed. The process may be repeated as warranted to gather more information regarding the general road weather condition.

Any wheel slippage or other variation in vehicle operation or positioning that is different from what is expected may be used by the on-board computer system to alter driving control for the vehicle in an autonomous driving mode. For example, the vehicle's planner module can use this information to adjust current and future braking, to other driving maneuvers and to select routes.

Sensor data obtained from the on-board sensor suite can assist the planner system. For instance, information obtained from various sensors (e.g., inertial and gyroscope, Lidar, etc. can be used to estimate the vehicle's pose where pose may include, for instance, position, orientation, curvature, change in curvature, longitudinal and lateral acceleration, speed, etc. Acceleration information may be particularly useful, as it relates directly to the road conditions. By way of example, on a dry road it may be assumed the vehicle can brake with a deceleration on the order of 8 $m/s^2$. On wet roads the deceleration may be much less, such as on the order of 5 $m/s^2$. On a snowy road, it may be on the order of 2-3 $m/s^2$, and on ice an even more conservative deceleration on the order of 0.5 $m/s^2$.

The actual (measured) pose of the vehicle on the roadway is derived from a previous pose and the acquired sensor data. The planner module or another part of the on-board computer system can compare the actual pose with the planned (or expected) pose on the roadway. During the active or passive testing operation, if there is no match between these poses, or if there is a detectable discrepancy or other variation in the data, the system may determine that the vehicle has lost traction. One such discrepancy may occur between reported wheel speeds and the vehicle's pose. Other discrepancies may occur in deviations from expected position, orientation and/or speed. By way of example only, the system may flag a discrepancy in longitudinal position if there is at least a 50 cm different between the actual and expected longitudinal positions. Similarly, the system may flag a discrepancy in lateral position if there is at least a 30 cm difference between the actual and expected lateral positions. In another example, if the orientation of the vehicle is off by more than about 1 degree, this may indicate an orientation discrepancy. And in a further example, if the speed differs by more than about 1 m/s, this may also be flagged as a discrepancy. Such discrepancies are merely exemplary.

Figure 7A:
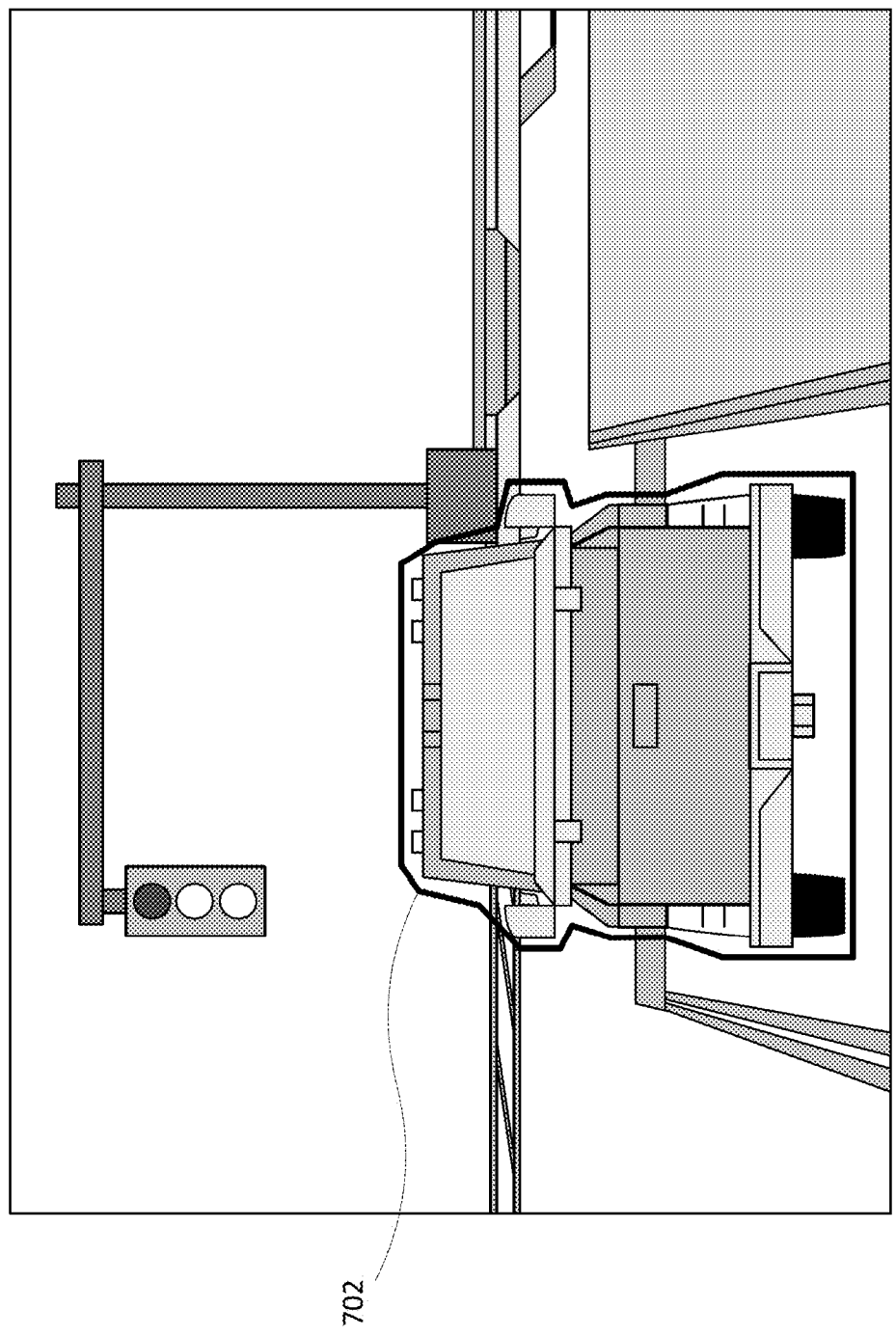
Figure 7C:
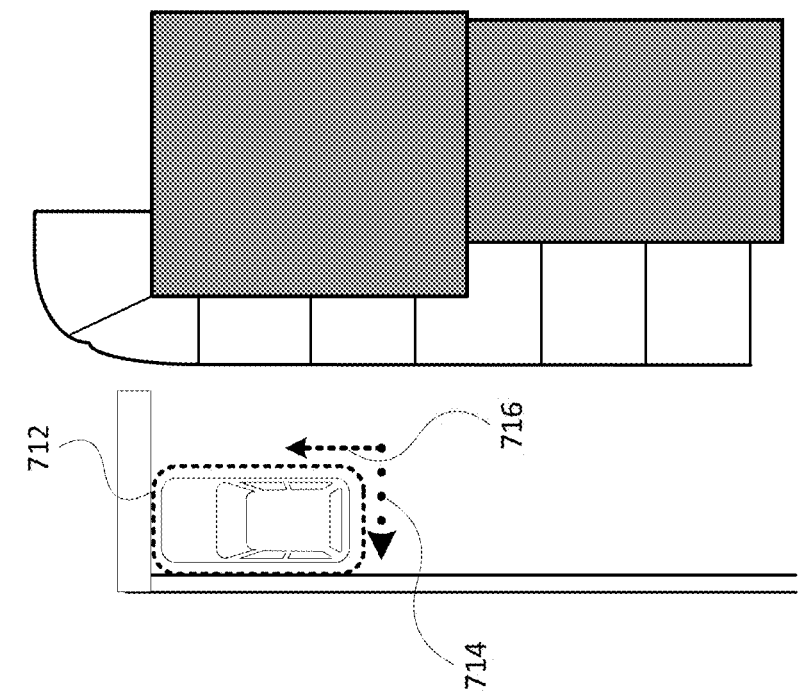
Figure 7D:
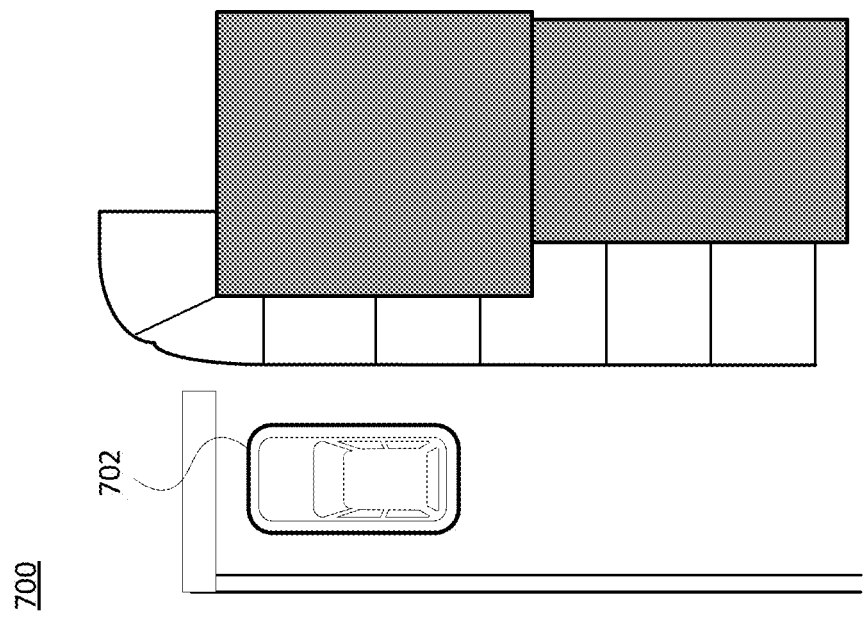

FIGS. 7A-B illustrate one example comparing expected and actual vehicle poses in a braking scenario. For instance, as shown in view 700 of FIG. 7A, as the vehicle approaches a red light, the deceleration system (e.g., 212 in FIG. 2) engages the brakes to cause the vehicle to stop. The on-board system may expect the vehicle to have an expected pose as shown by solid line 702 at a specific point in time. However, the system may detect an actual pose different from the expected pose. This is illustrated in view 710 of FIG. 7B by dotted line 712. This may include, e.g., a difference in lateral and/or longitudinal positioning, and/or a change in the yaw of the vehicle, such as to have the front end point more towards the right or left of the roadway. For instance, dotted arrow 714 illustrates the lateral variance and dashed arrow 716 illustrates the longitudinal variance from what was expected in FIG. 7A. FIGS. 7C-D illustrate eagle-eye views of the expected and actual scene, respectively.

Figure 8B:
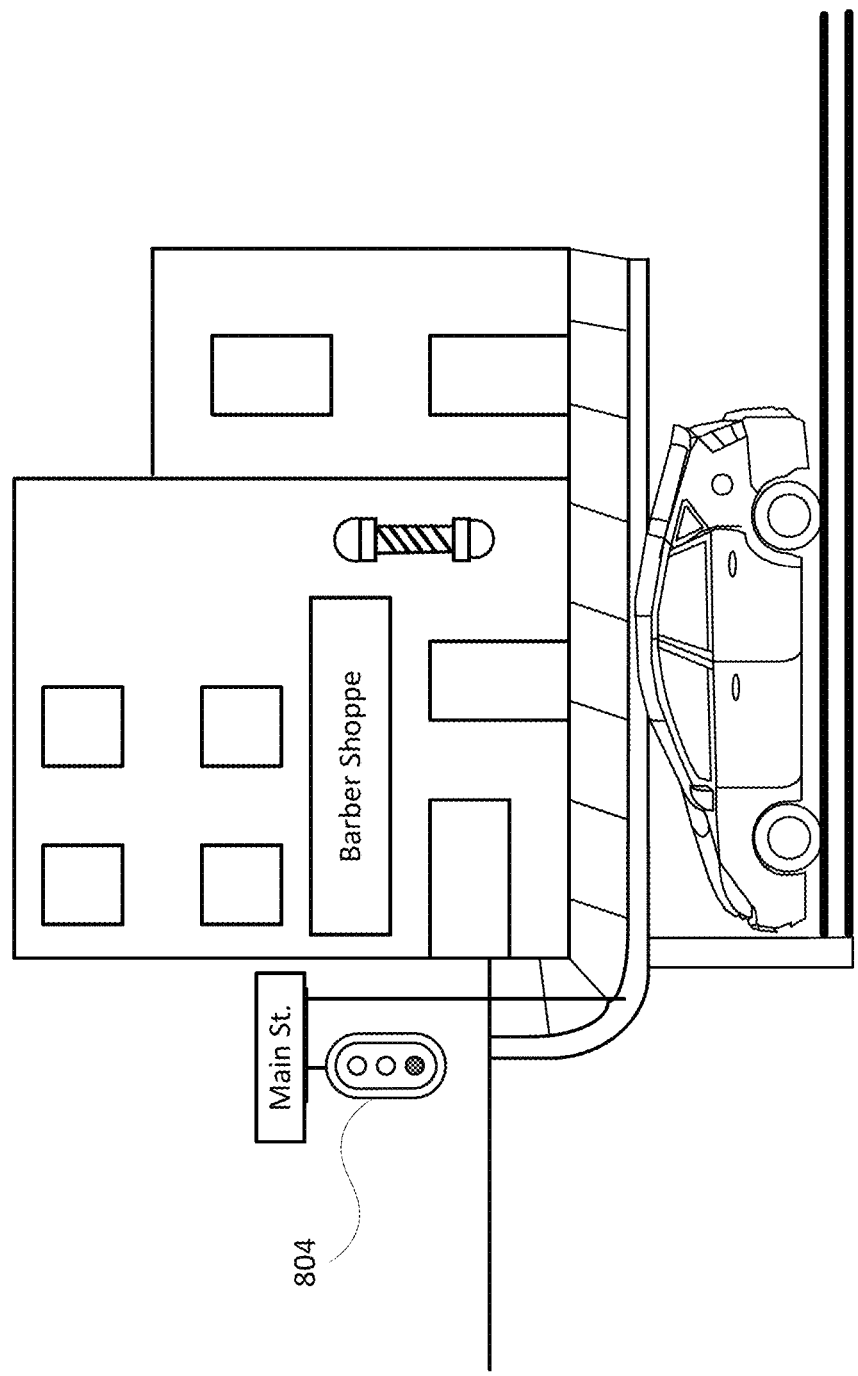
Figure 8D:
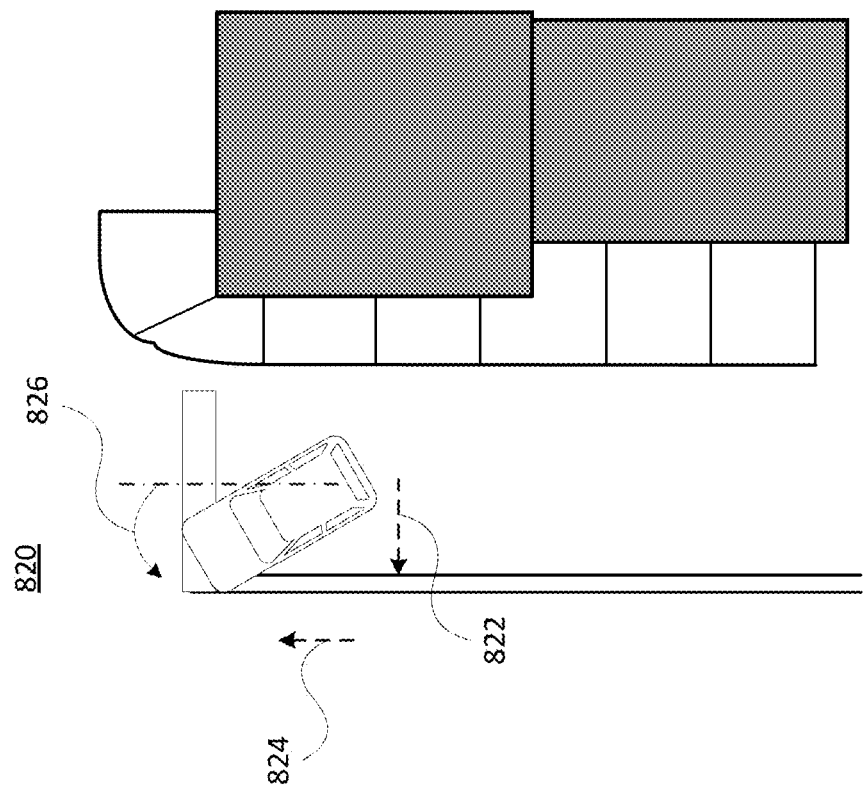
Figure 8C:
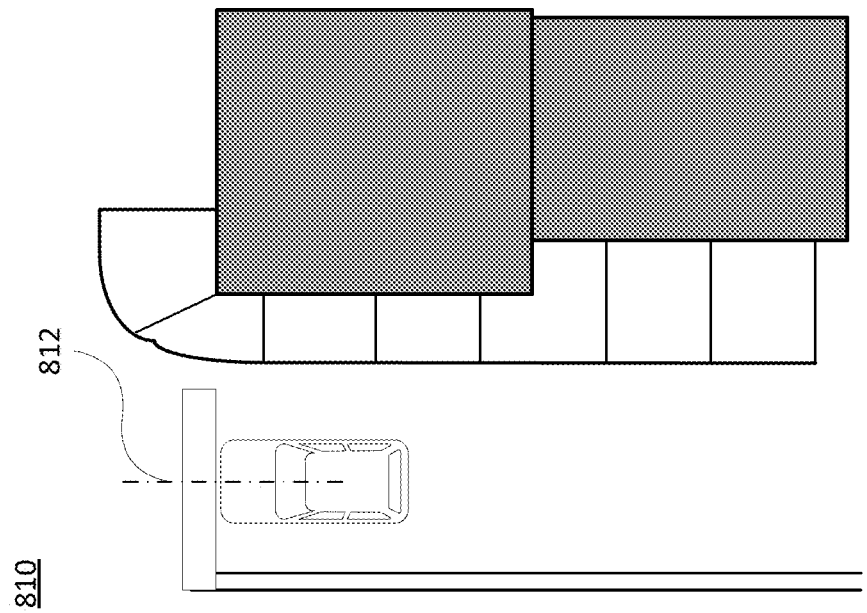

FIGS. 8A-D illustrate an example 800 comparing actual and expected vehicle poses in an acceleration scenario. For instance, FIG. 8A illustrates the vehicle stopped at an intersection while the stoplight is red (802). Once the stoplight turns green (804), the acceleration system (e.g., 214 in FIG. 2) engages, causes the wheels to rotate and the vehicle to move forward, as shown in FIG. 8B. FIGS. 8C-D illustrate eagle-eye views of the expected and actual scene. In particular, FIG. 8C illustrates expected scene 810, which shows the expected pose of the vehicle in response to the acceleration at a specific point in time. Here, dotted line 812 illustrates a linear path that the vehicle is expected to follow. However, FIG. 8D illustrates actual scene 820, which shows the actual pose of the vehicle at the specific point in time. In this case, dotted arrow 822 illustrates a lateral discrepancy, dotted arrow 824 illustrates a longitudinal discrepancy, and arcuate arrow 826 illustrates yaw of the vehicle to the left. Each of these pieces of information may indicate to the on-board system that the wheels lost traction during the acceleration process.

Figure 9A:
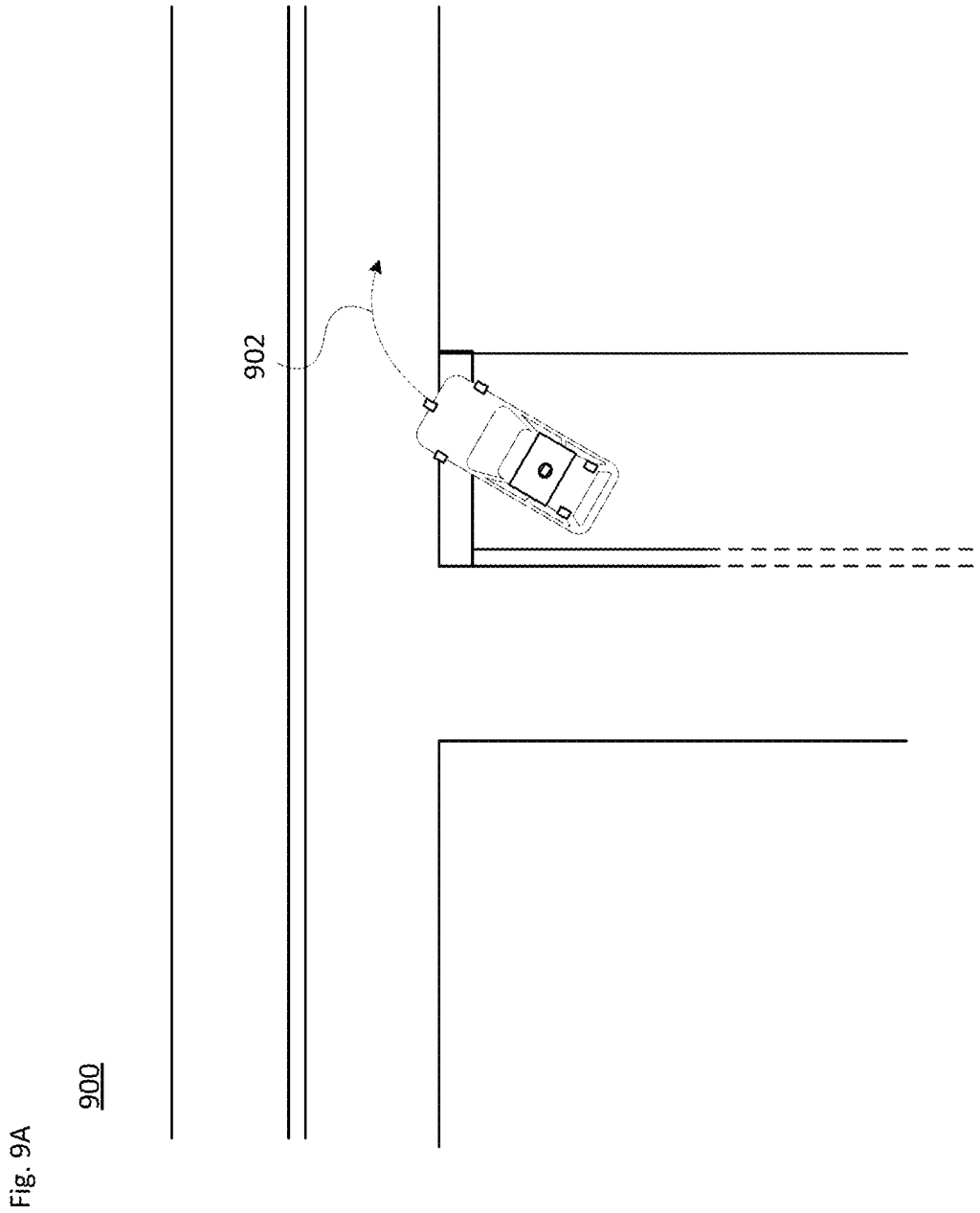
FIGS. 9A-B illustrate an example turning scenario in accordance with aspects of the technology.
Figure 9B:
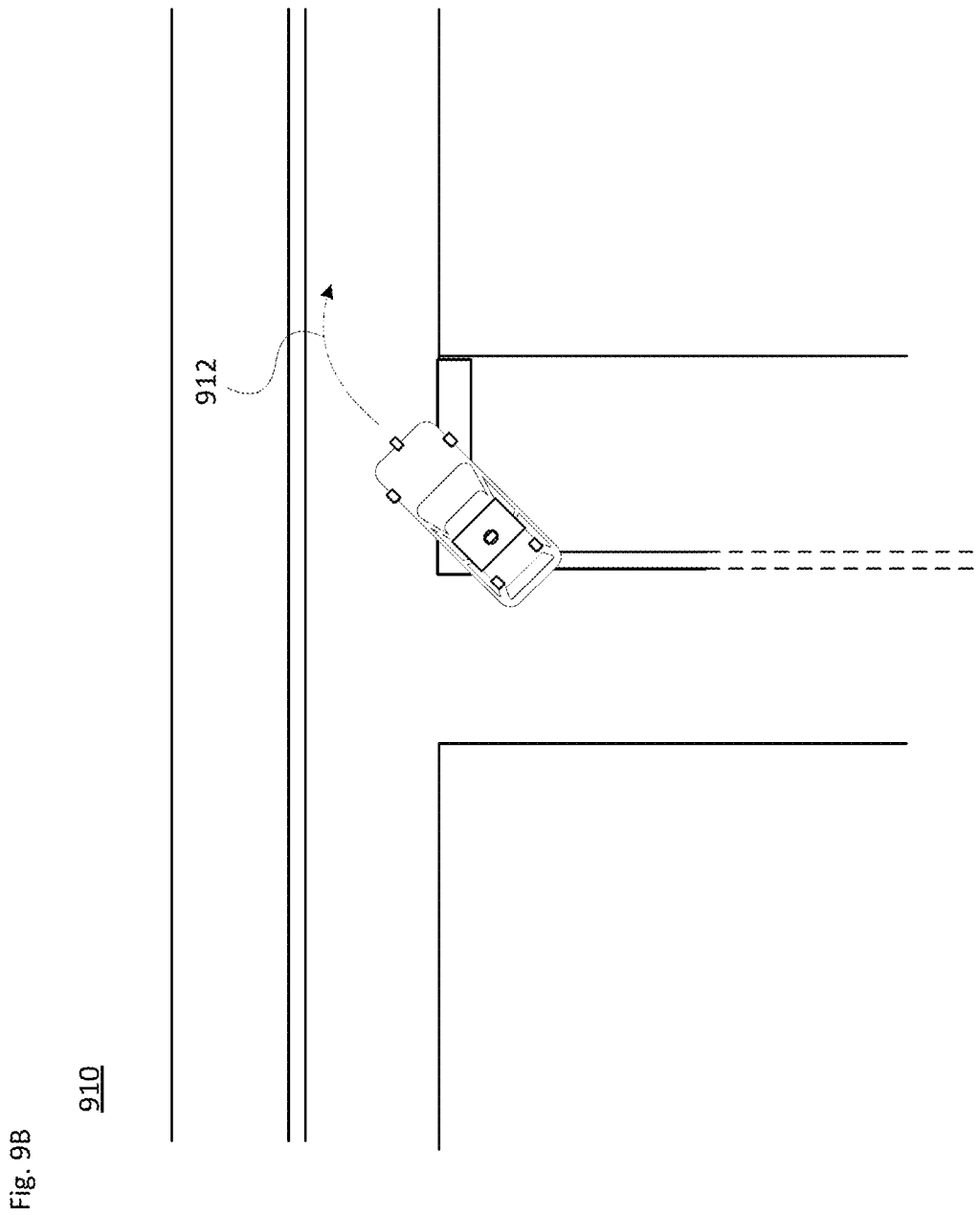

FIGS. 9A-B illustrate a turning example 900. Here, for instance, the vehicle is making a right hand turn at a T intersection. In this example, there may be no stop sign and clear lines of sight, and the vehicle may slow down to make the turn as opposed to initiating the turn from a full stop. In FIG. 9A, dashed arrow 902 illustrates the planned turning path. However, as shown in FIG. 9B, dash-dot arrow 912 illustrates the detected actual turning path from the on-board sensors (e.g., Lidar, radar, camera and/or inertial sensors). As can be seen in FIG. 9B, the vehicle's rear section has swung towards the left, and the turning path has moved closer to the double lines along the main roadway. The detected information in this case may indicate to the on-board system that the front and/or rear wheels lost traction while slowing down for the turn.

The examples in FIGS. 7-9 depict relatively extreme cases where a gross discrepancy in planned and observed pose is measured. In actuality, such discrepancies may be much smaller (or larger) for detecting that the vehicle is slipping due to the various road conditions.

Figure 10:
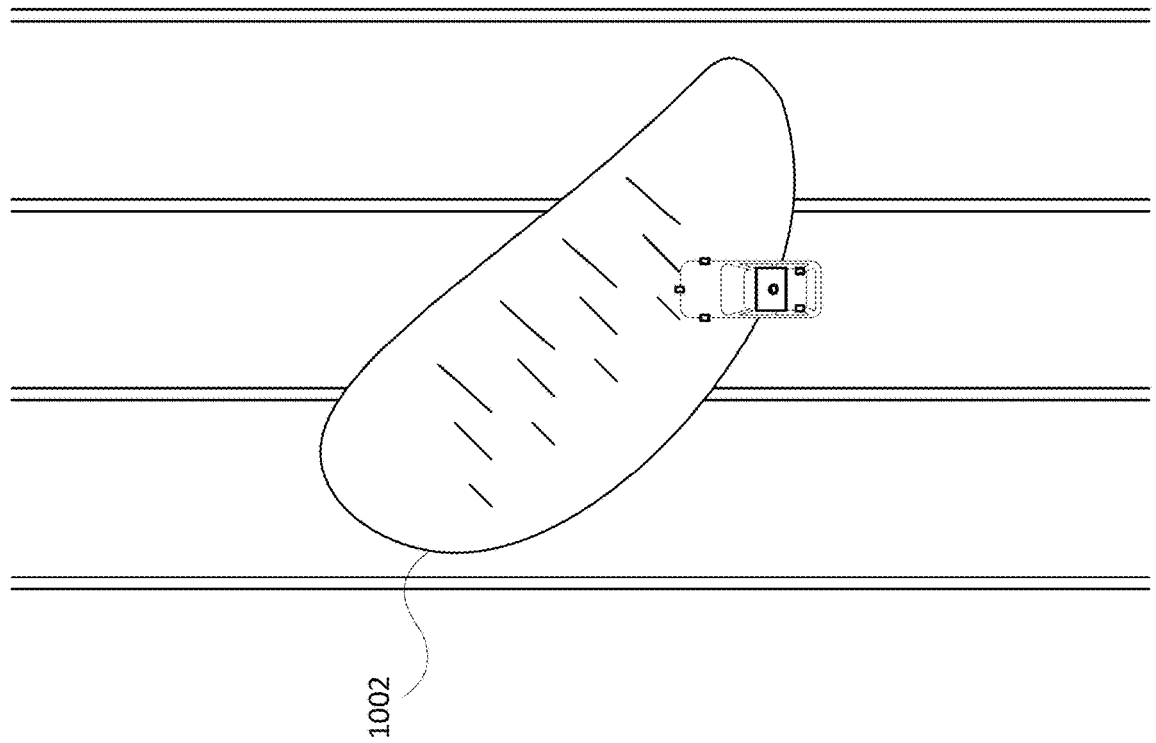
FIG. 10 illustrates an active test example to determine a traction condition in accordance with aspects of the technology.

FIG. 10 illustrates another example 1000, in which the system may detect a difference in an upcoming area of the roadway, and decide to perform an active test to determine a traction condition. For instance, one or more of the vehicle's sensors may detect an area 1002 that covers multiple lanes of the roadway. In this case, there may not be sufficient time to change to a different lane or otherwise alter the path of the vehicle. In this example, the on-board system may perform one or both of a braking operation or an acceleration operation while driving through the area 1002. The operation(s) may indicate a reduction in traction relative to another section of the roadway, for instance by detecting a lateral discrepancy, a longitudinal discrepancy and/or a yaw discrepancy. Of course, testing in such conditions would be conducted when it is determined to be safe. This may include limiting the testing to situations where there are no passengers in the vehicle, no surrounding vehicles within a predetermined distance (e.g., 250-400 m or more or less), and/or based on sensor data it is determined that the likelihood of losing traction or steering control is very low and that it is otherwise safe to operate the vehicle in this manner.

Figure 11A:
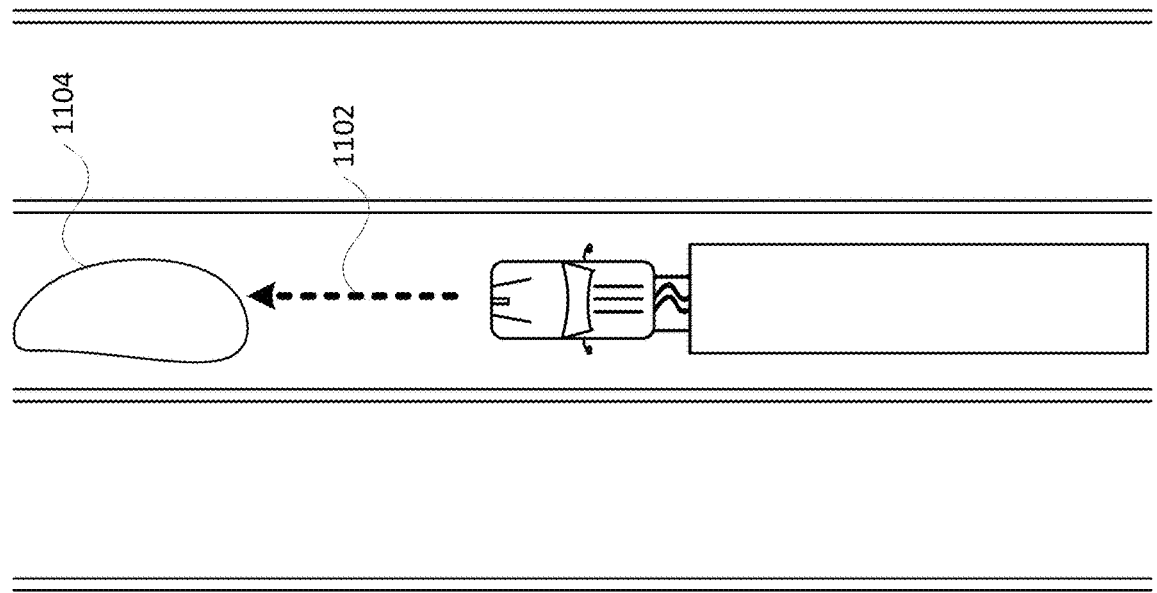
FIGS. 11A-C illustrate examples of route plan modification in accordance with aspects of the technology.
Figure 11B:
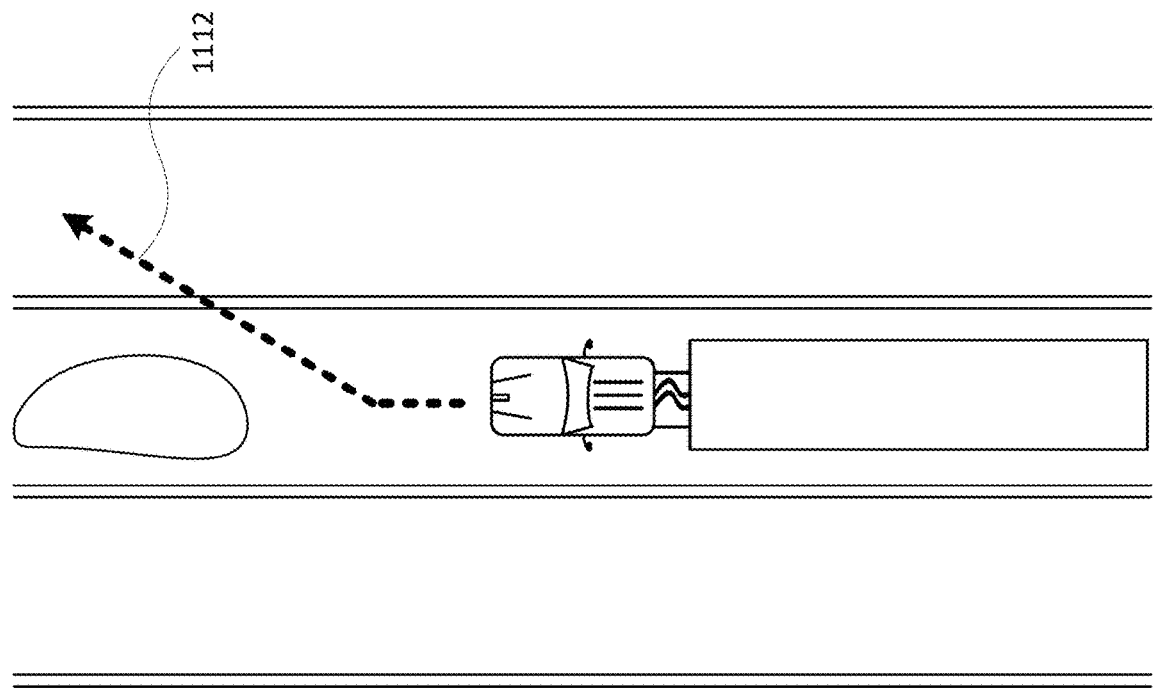

The system may also predict the likelihood of slippage of upcoming sections along the route based on the sensor data. Such a prediction may also factor in other information, such as received weather data, measured temperature and/or humidity information, topographical data from on-board maps, etc., as well as how other vehicles have driven through or along a particular stretch of roadway. An example of this is illustrated in FIGS. 11A-B. In particular, FIG. 11A illustrates a vehicle such as tractor-trailer 150 of FIG. 1C driving along a lane of a freeway. The planner module may have planned for the vehicle to stay in the lane as shown by straight arrow 1102. However, in this example, the vehicle's sensors may detect, or the on-board computer system may receive information from another vehicle or external system that there is ice or some other slippery substance 1104 in the lane ahead. In this case, as shown in FIG. 11B, the planner module alters the path as shown by angled arrow 1112, causing the vehicle's driving systems to change lanes.

Figure 11C:
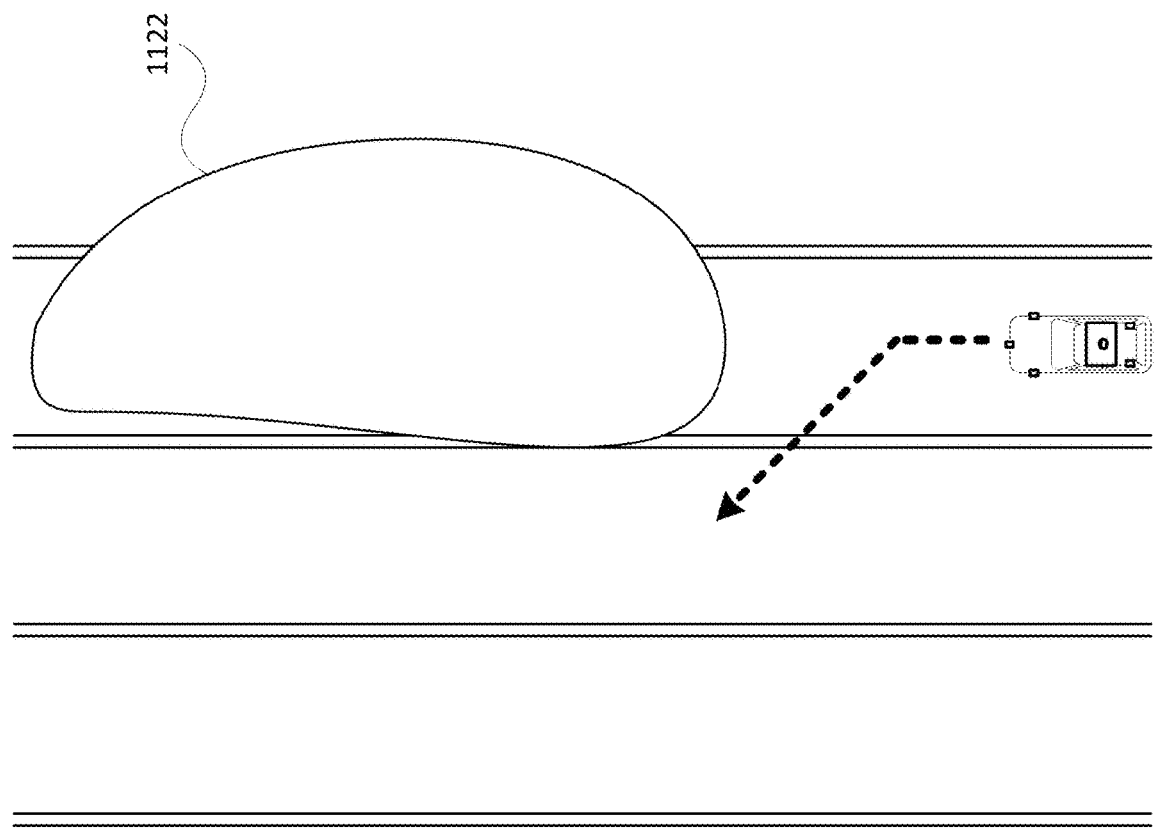

FIG. 11C illustrates a different situation 1120, in which the sensors detect that a lane or a section of the lane 1122 has "disappeared" or is otherwise not suitable for driving through. For instance, the sensors might fail to detect (or detect in some places but not others), lane markers, road elevation information, unexpected behavior of other vehicles (e.g., no longer driving within an expected lane border/geometry), etc. This may be due, e.g., due to snow accumulation, flooding of a section of the roadway, blockage due to debris such as rocks, branches, leaves, etc., or some other situation. In this case, the planner module or other part of the on-board computer system may cause the vehicle to change lanes to avoid the section 1122.

Figure 11D:
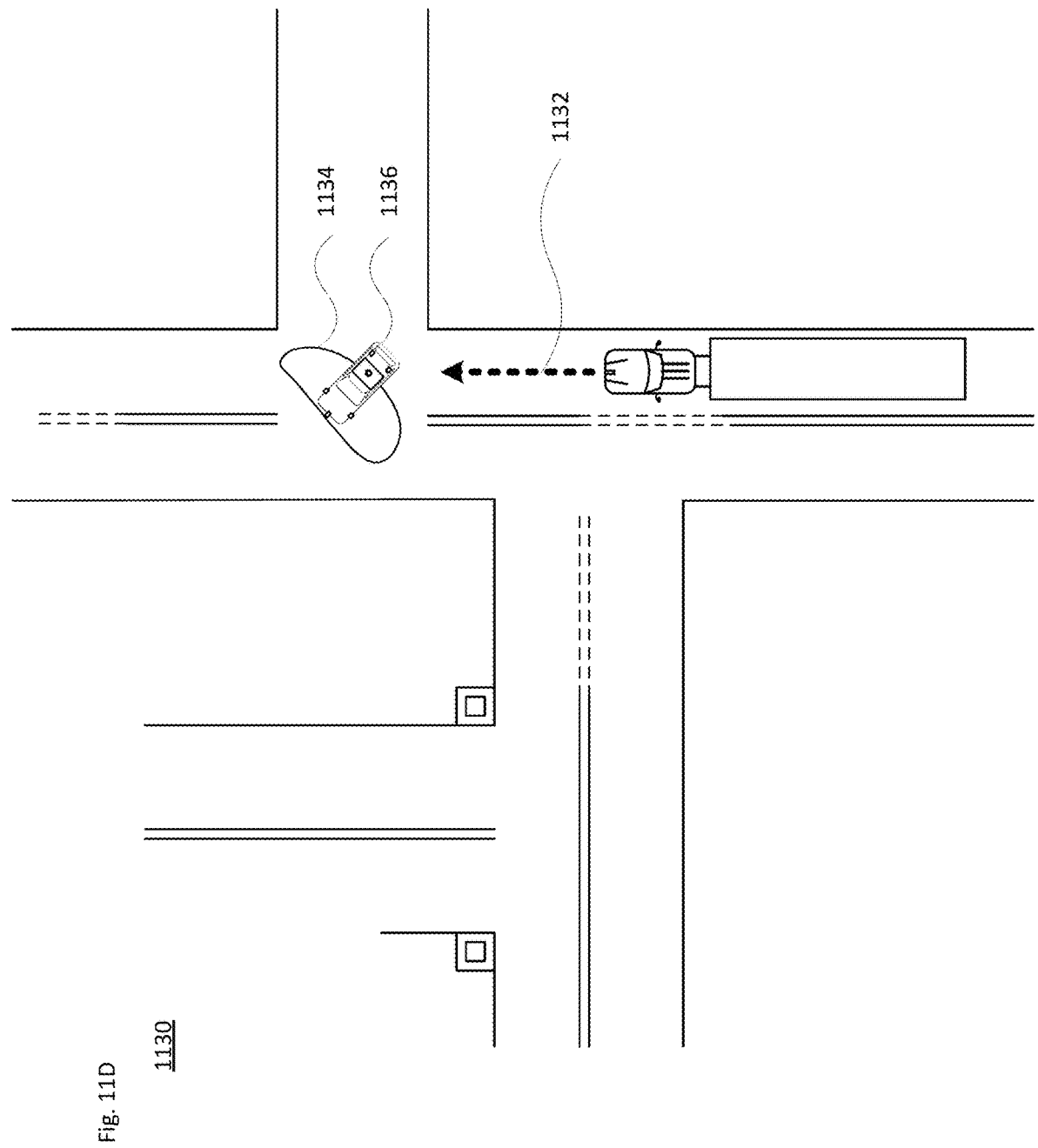

FIGS. 11D-E illustrate an example of route re-planning due to a slippery condition. As shown in view 1130 of FIG. 11D, the vehicle may detect or be informed of ice or some other slippery area 1134 along the planned route 1132. In this example, additional information, such as observing operation of another vehicle 1136, may support the determination that area 1134 is slippery. For instance, as shown the pitch of the vehicle 1126 may differ from what would be expected. Based on such information, as shown in view 1140 of FIG. 11E the system plans an alternative route 1142 to avoid the slippery area.

Figure 12A:
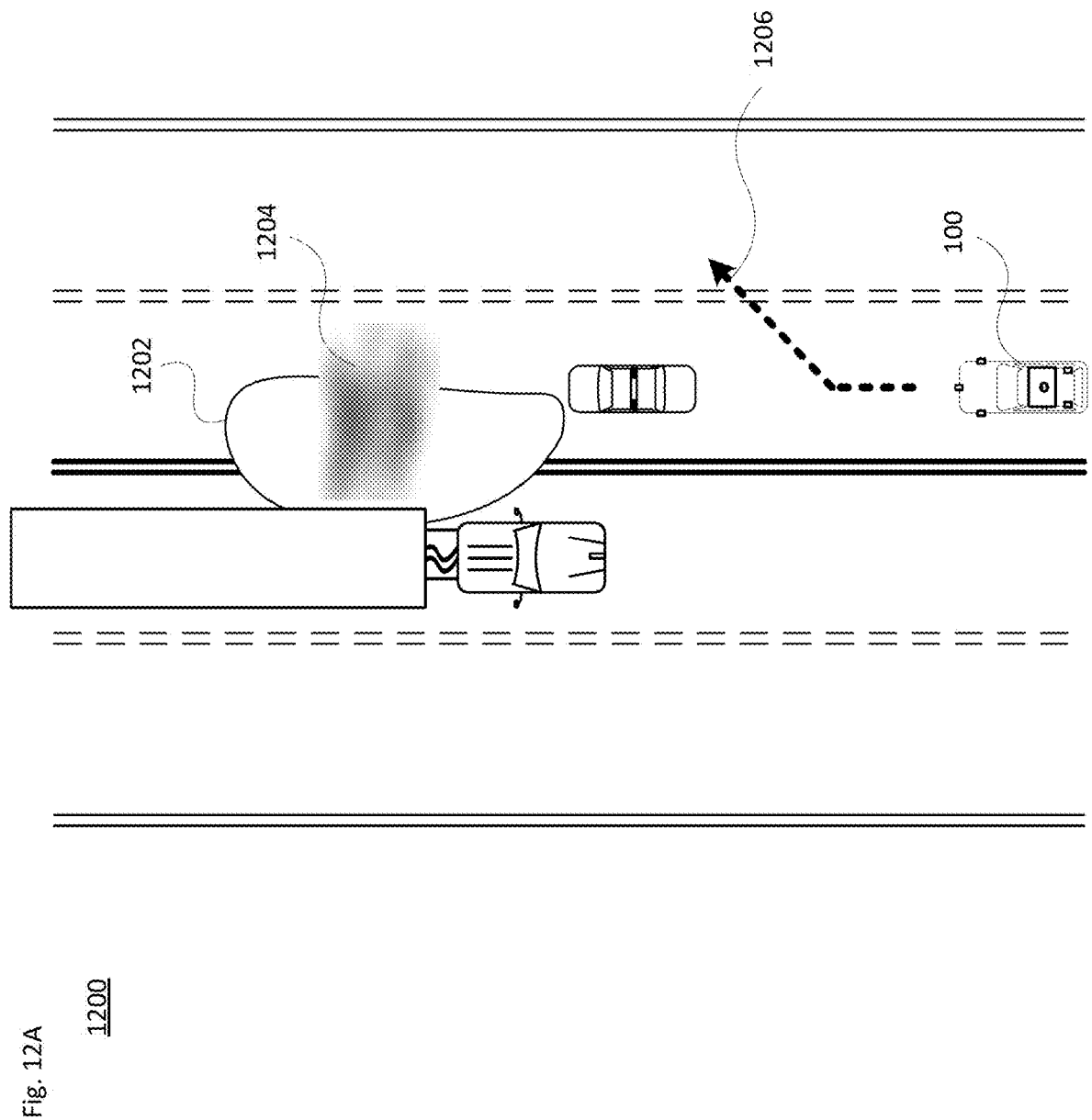
FIGS. 12A-B illustrate examples of modifying behavior predictions for detected objects based on analyzed road weather conditions in accordance with aspects of the technology.
Figure 12B:
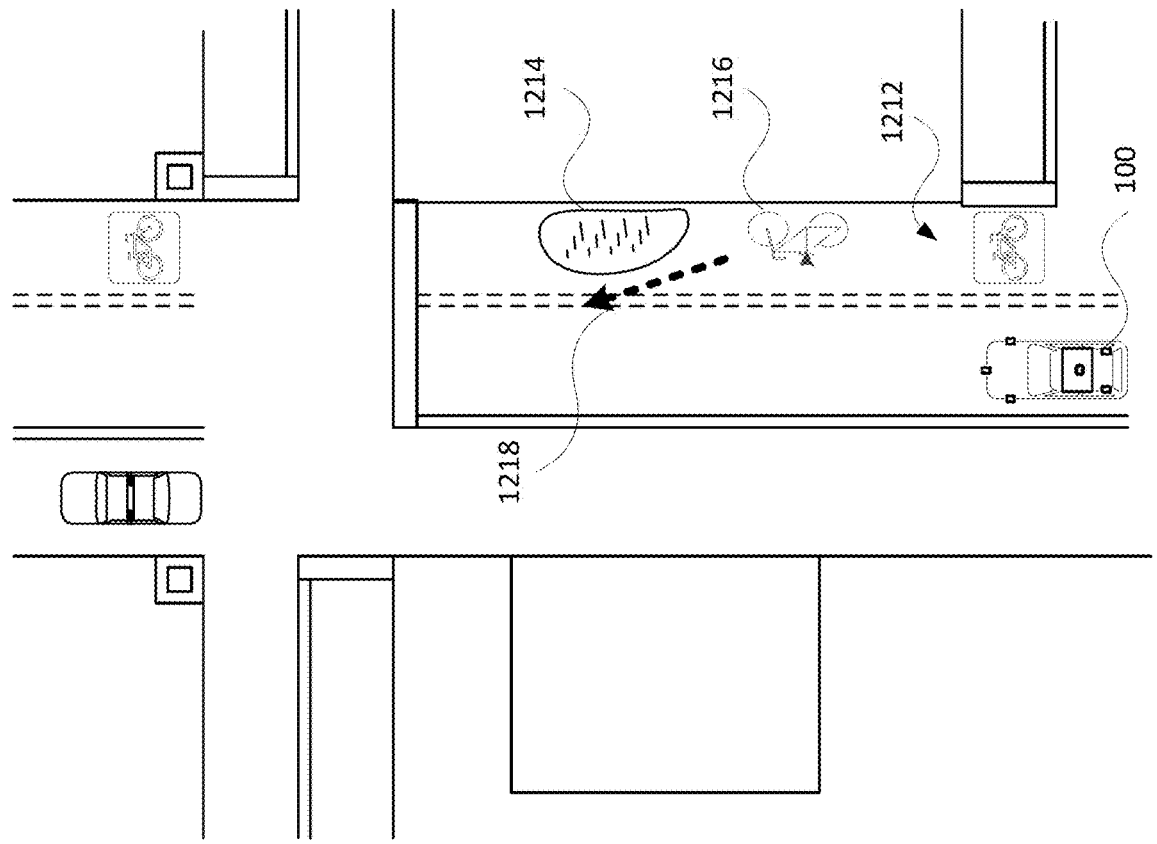

It is possible for the planner module or other part of the on-board computer system to modify the behavior predictions for detected objects based on the analyzed road weather conditions. For instance, FIGS. 12A and 12B illustrate other scenarios that consider an actual or imminent condition relating to a nearby vehicle or other object in the environment. In particular, FIG. 12A shows a situation where there are multiple vehicles on the road, as well as a detected object 1202 on a portion of the road surface. At a first point in time, the vehicle 100 may not be able to determine what the detected object 1202 is. However, at a second point in time, the sensors of vehicle 100 may detect a new object 1204 adjacent or otherwise nearby to the object 1202. In this case, new object 1204 may be detected when another vehicle, such as a truck going in the opposite direct, passes over a portion of the object 1202. Based on such detected information, the on-board system of vehicle 100 may determine that object 1204 is water spray from object 1202, further indicating that object 1202 is a puddle. In this situation, vehicle 100 may continue driving in the lane that includes the puddle. Or, as shown by dotted arrow 1206, the vehicle 100 may change lanes to avoid the puddle and potential further water spray, which may be caused by other vehicles driving through the puddle.

FIG. 12B shows a different situation 1210, in which the on-board system may predict an action of another object in view of a weather condition. In this example, vehicle 100 is driving along a roadway that includes a bicycle lane 1212. In this case, vehicle 100 detects an object 1214 on the roadway, and also detects a bicyclist 1216 in the bicycle lane 1212. The vehicle 100 may determine that object 1214 is a puddle or some other obstruction. Even though the bicyclist 1216 has not yet taken any corrective action, the on-board system of vehicle 100 may predict that the bicyclist 1216 will avoid the object 1214, for instance by changing his or her path, as shown by dotted arrow 1218. Based on this prediction, vehicle 100 may take a corrective action such as slowing down to allow the bicyclist 1216 time to pedal around the object 1214. In this case, the vehicle 100 may signal to the bicyclist 1216, e.g., via signaling system 218 of FIG. 2 or merely by slowing down, that the vehicle 100 is aware of the bicyclist 1216 and is giving him or her space to pass around the object 1214.

Specific types of objects may also impact the analysis regarding road weather conditions. For instance, a traffic cone adjacent to a lane may indicate a pothole or puddle. Construction signs or other construction items may also indicate changes to or issues with the road surface that can be impacted by snow, rain or ice (e.g., road resurfacing before repaving). Furthermore, a puddle may be the result of a newly formed pothole. Here, an elevation map employed by the planner module might not indicate the presence of a pothole, but recent rains may result in the puddle.

Figure 13:
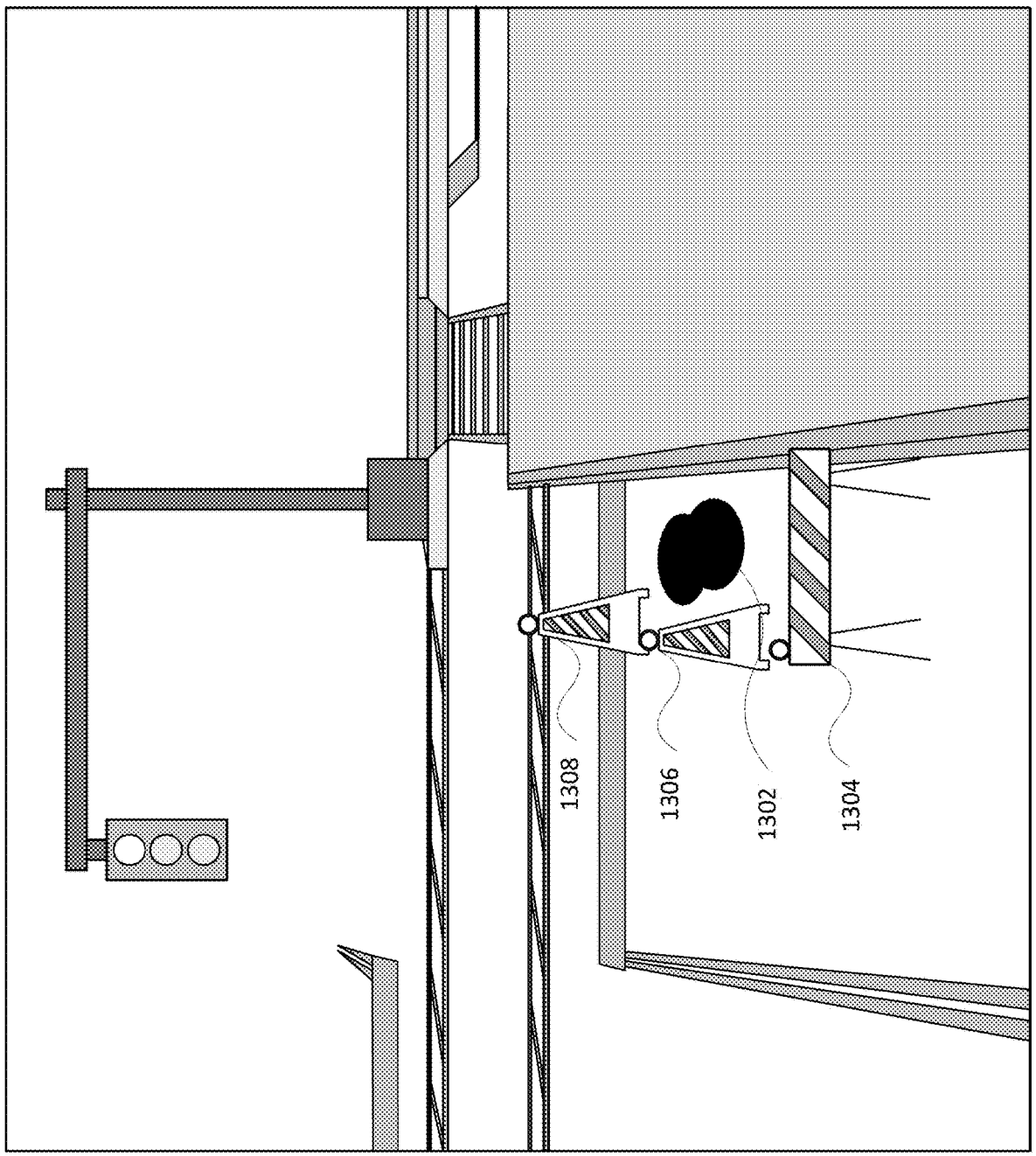
FIG. 13 illustrates an example of object analysis in accordance with aspects of the technology.

An example of this is shown in FIG. 13. Here, scene 1300 depicts a portion of a road adjacent to an intersection. The vehicle's sensors may detect an object 1302 where the elevation map does not indicate anything. However, the vehicle's sensors may also detect construction items 1304, 1306 and 1308. Based on these objects placed around or otherwise near to object 1302, the system may infer that object 1302 could be water covering pothole, and alter the route to avoid that object and the construction items.

The vehicle's sensors may be used to validate detection of the general road weather conditions. This may involve performing test maneuvers, such as changing lanes, speeding up or slowing down and evaluating data from inertial sensors, braking sensors, Lidar or imaging sensors, etc. Alternatively (or in addition), it may involve observing actions by other vehicles or objects. For instance, how a bicyclist maneuvers—as detected by Lidar or other sensors—may indicate the presence of a puddle on the roadway. Here, information about a (possible) puddle may be used to filter out spurious sensor signals.

One type of test maneuver is to have one or more vehicles drive through the same (expected) puddle at different speeds or positional offsets. The indication of water spray, e.g., as detected by the Lidar, radar, camera and/or acoustical sensor (s) may help the planner module of another vehicle to determine whether that vehicle should drive through or around the puddle. Such information may also be shared with other nearby vehicles and/or communicated to a remote assistance system, as discussed below. How the water spay affects obtained sensor data may also be incorporated into the route planning and other system operations.

Another exemplary test maneuver is for multiple vehicles to try different lateral offsets along a snowy route. This can be done to determine the best (highest) friction on the road. The depth and/or "quality" of snow (e.g., powdery, slushy, compacted) may be determined by driving through it and evaluating how the vehicle responds, with or without performing braking and/or accelerating operations. Sensor data (e.g., from the Lidar) can be used in conjunction with this. An example of this is shown in FIGS. 14A-B. For instance, FIG. 14A illustrates vehicle 100 driving in a lane behind a lead vehicle 1402. In this example, sensors of the vehicle 100 detect an object 1404 on the roadway, which may be snow, ice patch, hail, a puddle, or other objects that make it difficult to detect lane markers but which allow the system to follow the tracks of other vehicles. The lead vehicle 1402 can be part of the same fleet as vehicle 100, or otherwise be able to communicate with vehicle 100, either directly or indirectly, via a fleet management system or other backend system. The sensors of the vehicle 100, such as Lidar sensors or camera, may detect tracks 1406 from the lead vehicle 1402. In view of this, as shown in FIG. 14B the vehicle 100 may maneuver slightly or otherwise position its wheels to be offset from tracks 1406, creating its own tracks 1412. Information obtained by one or both vehicles 100 and 1402 as they drive through the object 1404 (e.g., snow) can help determine the depth and/or quality of that object. This information can help the vehicle 100 or other vehicles along the roadway when maneuvering along other portions of the roadway with similar detected objects. The information may be communicated either vehicle-to-vehicle or vehicle-to-fleet management or other backend system. In one scenario, the information is used to update a map used by the fleet, as inputs to vehicles' planners and/or directly communicated as warnings to vehicles in the area.

The vehicle's autonomous driving system may deal with other issues relating to snow. This can include determining whether there is a snow bank on the side of the road (see FIG. 11C), whether one or more lanes have been plowed while others have not, and whether there is snow on top of ice. For instance, the current detected conditions may indicate new snow, but the system may know (e.g., from obtained weather reports or a remote assistance service) that it also snowed the day before. This can affect current driving conditions, and the on-board system may share this information with nearby vehicles or a remote assistance service. Furthermore, the planner module or other portion of the computer system can account for expected snow accumulation during the drive as part of route planning.

Other aspects of the system may involve immediate corrective action and route re-planning. The immediate corrective action may include specific braking techniques or patterns to avoid a skid or to pull out of a skid. And the planner module may make adjustments to the route to avoid or minimize the possibility of slippage. For instance, the vehicle may change lanes to avoid an upcoming icy patch as shown in FIG. 11B, brake hard before an upcoming icy patch in order to reduce speed and then travel over the icy patch with low but constant speed, or may take an alternative route that avoids upcoming hilly portions of the roadway. In other examples, route re-planning may include taking a closer or farther exit on the freeway, changing the destination location (e.g., a drop-off point), etc. Still further, the vehicle can drive more slowly where speed is a function of the road conditions, such as 5-10 mph or more below a posted speed. In yet another example, knowing which wheels are slipping would help in mapping the slippery area. Here, the control system (e.g., planner module) could instruct the steering system to make adjustments so that the vehicle moves more to the side of the lane that is not slippery or is or less slippery.

Observing how other vehicles are currently driving in front of or around the vehicle can also be factored into the analysis. Aside from the puddle examples discussed above with regard to FIGS. 12A and 12B, the vehicle may detect how other vehicles are acting in general, and may develop slip or skid profiles for surrounding vehicles. This may also indicate the road conditions in general. Thus, the system may modify its behavior prediction models for nearby vehicles, and may also adjust driving operations for the vehicle. In one example, if the road is a 45 mph zone and the cars in front are driving around 35 mph, but then a newly observed car comes from behind doing 50 mph, the system may evaluate the behavior model for the car in view of the slip/skid profile and speeds involved.

Depending on the specific road weather conditions and the type of vehicle, the absolute position of the pose may begin to diverge slowly (e.g., over seconds or more). However, the system may be able to detect changes or discrepancies in the higher order terms. For example, if the vehicle's wheels are locked (e.g., no ABS brakes on the vehicle or a brake malfunction), the deceleration system would report that the vehicle is currently traveling at 0 mph or m/s. Nonetheless, the pose velocity would be non-zero and potentially much higher. Similarly, during a turn the difference in measured versus expected yaw rate is potentially more informative than the absolute vehicle orientation.

The results of such determinations may be fed back to the planner module or another part of the vehicle's control system and can be used in various ways. For instance, depending on the amount of determined traction loss, the system may adjust the amount of allowable deceleration (or acceleration) used in trajectory generation along a given portion of the route. If cars or other objects are detected (e.g., via Lidar, radar, cameras or other sensors) ahead of or behind the vehicle, additional headway may be incorporated into the driving plan. Pre-emptive braking may also be performed to avoid a potential collision situation. The braking profile and/or a desired stopping point can also be selected according to the above information.

Figure 15A:
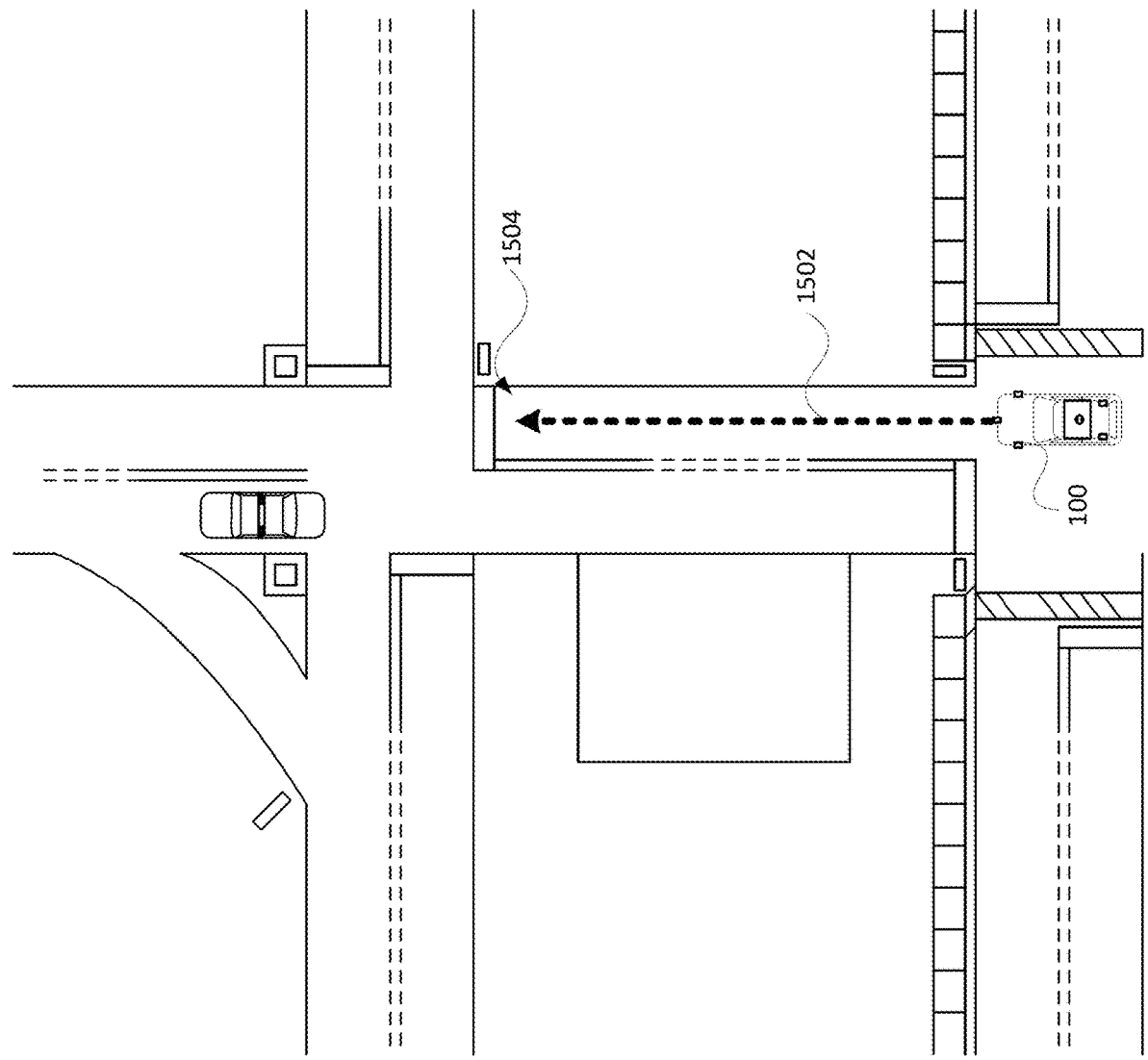
FIGS. 15A-B illustrate an example of adjusting a braking profile or a desired stopping point in accordance with aspects of the technology.
Figure 15B:
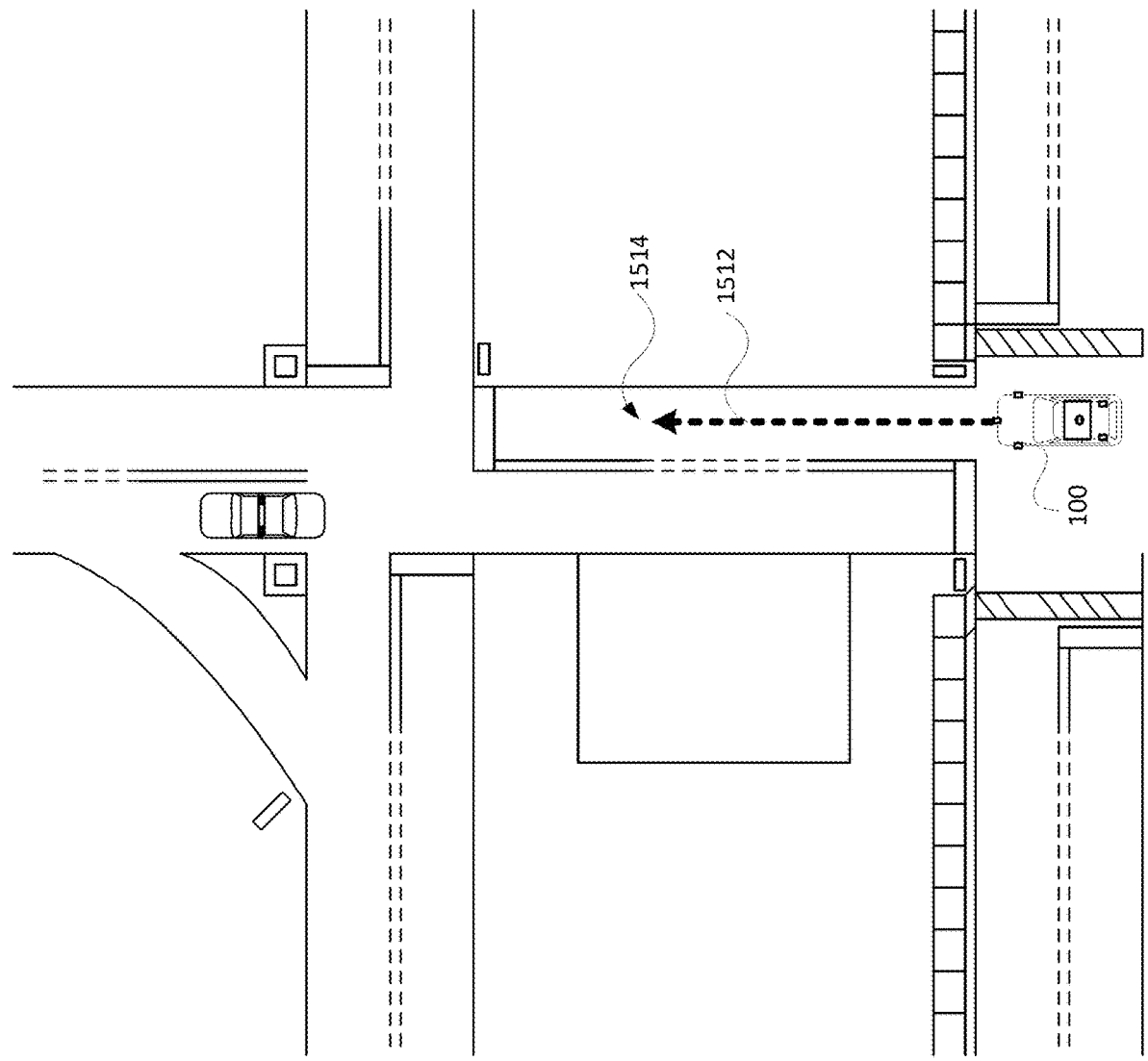

One example of this is shown in FIGS. 15A-B. In particular, FIG. 15A illustrates vehicle 100 approaching an intersection. The planner module may have an initial plan for the vehicle to brake according to a default braking profile as shown by dotted path 1502, to cause the vehicle to arrive at a desired stopping point illustrated by arrow 1504. However, in view of detected, observed or expected reduced traction as discussed above, the planner module may change to a modified plan. For instance, as shown in FIG. 15B, a secondary braking profile shown by dotted path 1512 may be employed to cause the vehicle to arrive at an earlier stopping point illustrated by arrow 1514 that is farther from the intersection than desired stopping point 1504.

Figure 15C:
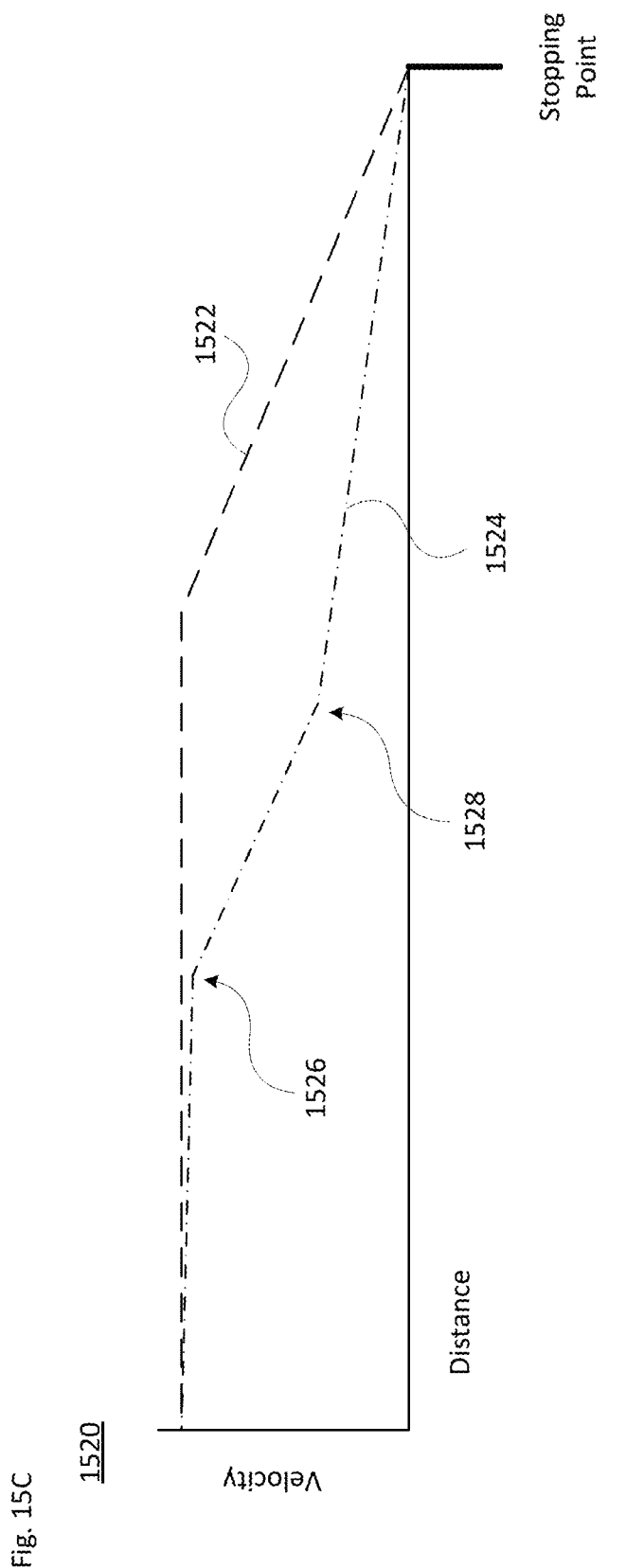
FIG. 15C illustrates an example of contrasting speed profiles in accordance with aspects of the technology.

FIG. 15C illustrates an example 1520 of contrasting speed profiles. Here, both speed profiles are selected to arrive at the same stopping point. A first speed profile is shown by dashed line 1522. Here, for a first period of time the vehicle's speed is generally constant. Then as the vehicle approaches the stopping point, the default braking profile may be employed to bring the vehicle to a full stop. The second speed profile is shown by dash-dot line 1524. As with the first speed profile, the speed during the first period of time may also be generally constant. However, upon detection of a slippery road condition as shown by arrow 1526, the system may begin active or passive speed reduction. Then at point 1528, the system may more gradually reduce the velocity in order to achieve a full stop at the stopping point. The latter approach of the second speed profile may employ less braking, or braking in advance place where the road is slippery.

As noted above, the technology is applicable for various types of wheeled vehicles, including passenger cars, buses, RVs and trucks or other cargo carrying vehicles.

In addition to using the wheel slippage information for operation of the vehicle, this information may also be shared with other vehicles, such as vehicles that are part of a fleet. The information can be used for real time map updates, which can also be shared with fleet vehicles.

Figure 16A:
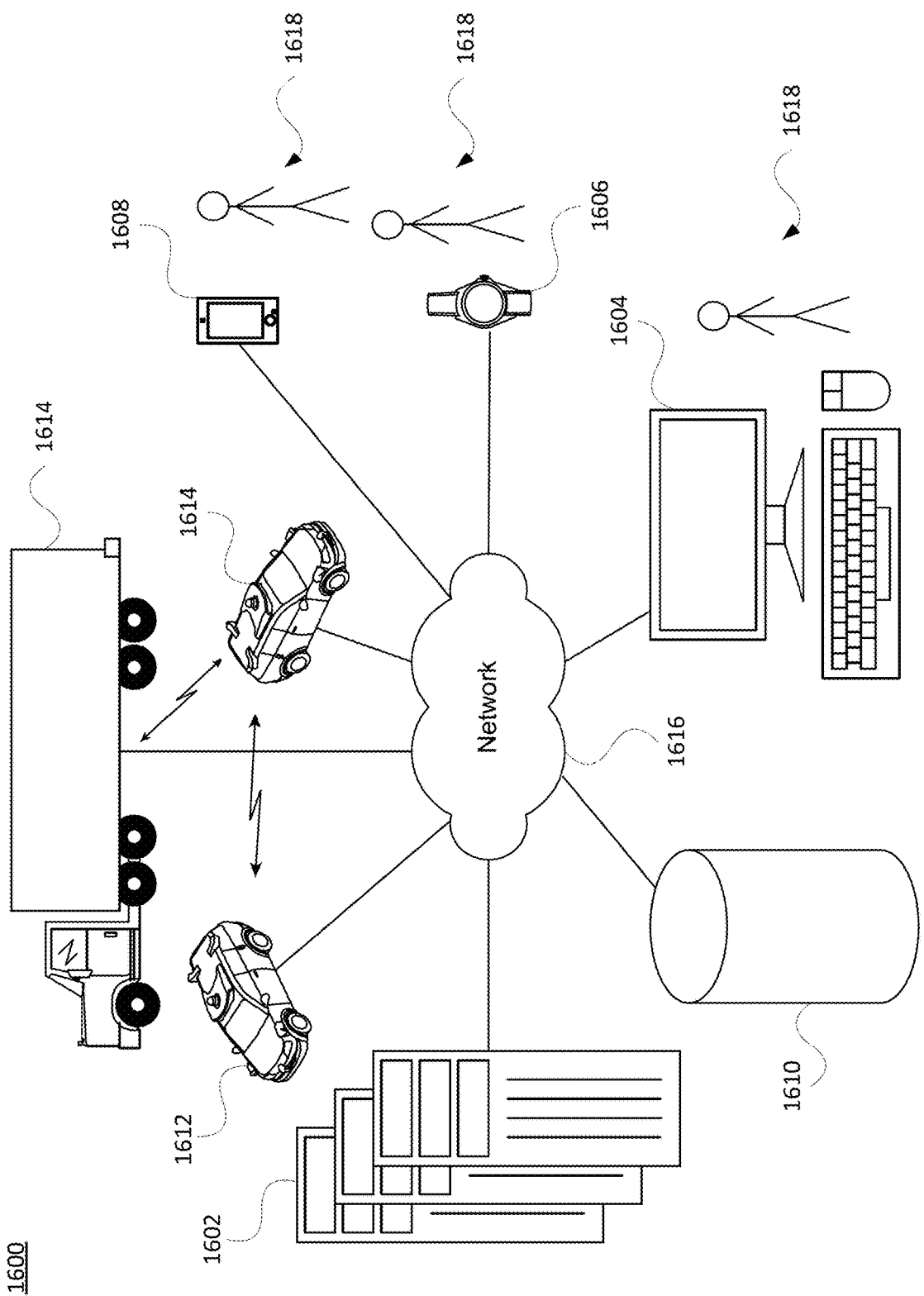
FIGS. 16A-B illustrates an example system in accordance with aspects of the technology.
Figure 16B:
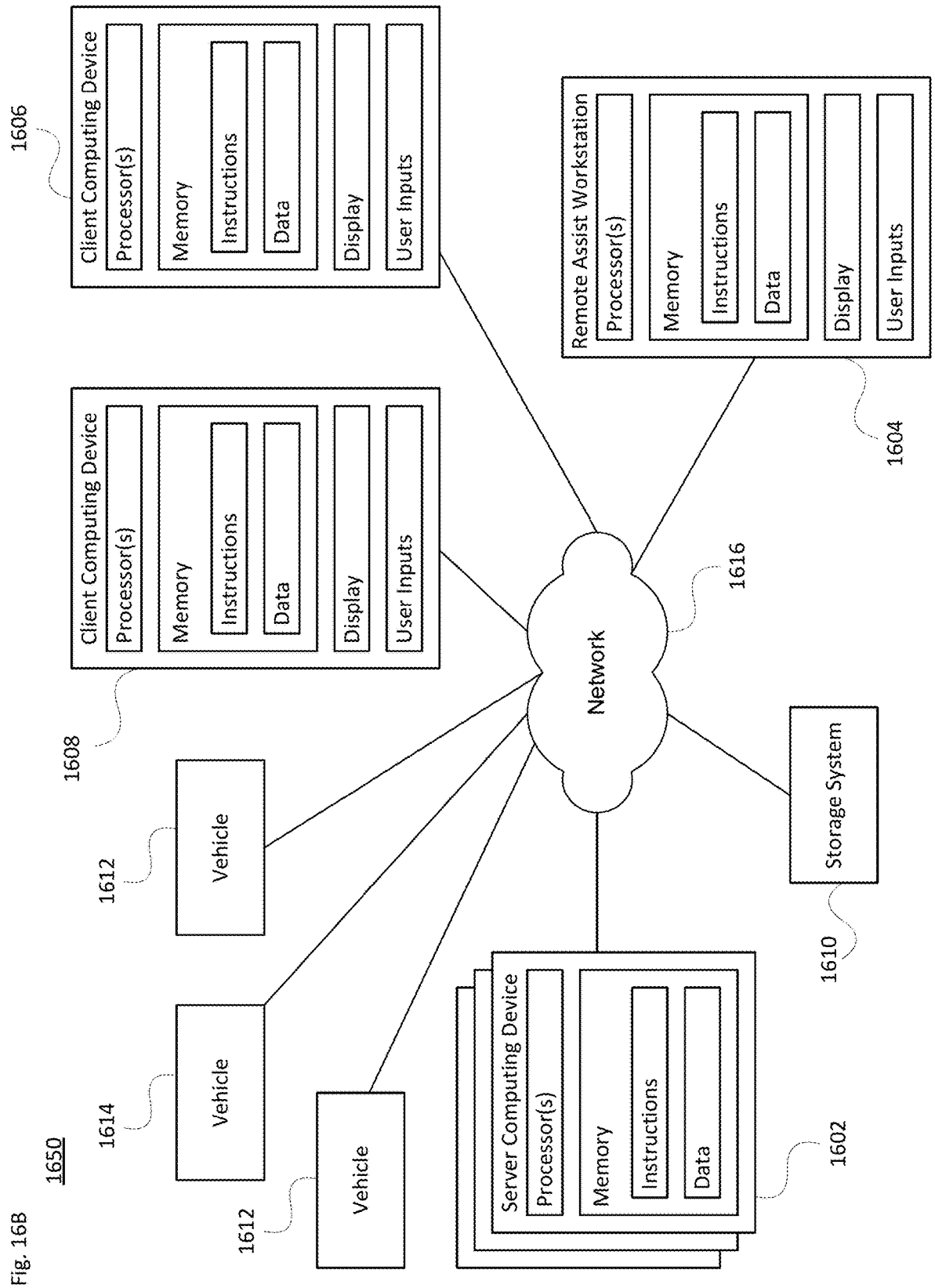

One example of this is shown in FIGS. 16A and 16B. In particular, FIGS. 16A and 16B are pictorial and functional diagrams, respectively, of an example system 1600 that includes a plurality of computing devices 1602, 1604, 1606, 1608 and a storage system 1610 connected via a network 1616. System 1600 also includes vehicles 1612 and 1614, which may be configured the same as or similarly to vehicles 100 and 150 of FIGS. 1A-B and 1C-D, respectively. Vehicles 1612 and/or vehicles 1614 may be part of a fleet of vehicles. Although only a few vehicles and computing devices are depicted for simplicity, a typical system may include significantly more.

As shown in FIG. 16B, each of computing devices 1602, 1604, 1606 and 1608 may include one or more processors, memory, data and instructions. Such processors, memories, data and instructions may be configured similarly to the ones described above with regard to FIG. 2.

The various computing devices and vehicles may communication via one or more networks, such as network 1616. The network 1616, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1602 may include one or more server computing devices having a plurality of computing devices, e.g., a load balanced server farm, that exchange information with different nodes of a network for the purpose of receiving, processing and transmitting the data to and from other computing devices. For instance, computing device 1602 may include one or more server computing devices that are capable of communicating with the computing devices of vehicles 1612 and/or 1614, as well as computing devices 1604, 1606 and 1608 via the network 1616. For example, vehicles 1612 and/or 1614 may be a part of a fleet of vehicles that can be dispatched by a server computing device to various locations. In this regard, the computing device 1602 may function as a dispatching server computing system which can be used to dispatch vehicles to different locations in order to pick up and drop off passengers or to pick up and deliver cargo. In addition, server computing device 1602 may use network 1616 to transmit and present information to a user of one of the other computing devices or a passenger of a vehicle. In this regard, computing devices 1604, 1606 and 1608 may be considered client computing devices.

As shown in FIG. 16A each client computing device 1604, 1606 and 1608 may be a personal computing device intended for use by a respective user 1618, and have all of the components normally used in connection with a personal computing device including a one or more processors (e.g., a central processing unit (CPU)), memory (e.g., RAM and internal hard drives) storing data and instructions, a display (e.g., a monitor having a screen, a touchscreen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 1606 and 1608 may mobile phones or devices such as a wireless-enabled PDA, a tablet PC, a wearable computing device (e.g., a smartwatch), or a netbook that is capable of obtaining information via the Internet or other networks.

In some examples, client computing device 1604 may be a remote assistance workstation used by an administrator or operator to communicate with passengers of dispatched vehicles. Although only a single remote assistance workstation 1604 is shown in FIGS. 16A-16B, any number of such work stations may be included in a given system. Moreover, although operations work station is depicted as a desktop-type computer, operations works stations may include various types of personal computing devices such as laptops, netbooks, tablet computers, etc.

Storage system 1610 can be of any type of computerized storage capable of storing information accessible by the server computing devices 1602, such as a hard-drive, memory card, ROM, RAM, DVD, CD-ROM, flash drive and/or tape drive. In addition, storage system 1610 may include a distributed storage system where data is stored on a plurality of different storage devices which may be physically located at the same or different geographic locations. Storage system 1610 may be connected to the computing devices via the network 1616 as shown in FIGS. 16A-B, and/or may be directly connected to or incorporated into any of the computing devices.

Storage system 1610 may store various types of information. For instance, the storage system 1610 may also store autonomous vehicle control software which is to be used by vehicles, such as vehicles 1612 or 1614, to operate such vehicles in an autonomous driving mode. Storage system 1610 may store map information, route information, braking and/or acceleration profiles for the vehicles 1612 and 1614, weather information, etc. This information may be shared with the vehicles 1612 and 1614, for instance to help with real-time route planning and traction analysis by the on-board computer system(s). The remote assistance workstation 1204 may access the stored information and use it to assist operation of a single vehicle or a fleet of vehicles. By way of example, a lead vehicle may detect a slippery condition, such as slippery substance 1104 of FIG. 11A, and send information about the slippery condition to the remote assistance workstation 1604. In turn, the remote assistance workstation 1604 may disseminate the information to other vehicles in the fleet, so that they may alter their routes (see, e.g., angled arrow 1112 of FIG. 11B).

Remote assistance may also request one or more vehicles along a given stretch of roadway to perform a passive and/or active traction test, for instance to confirm or validate a prior detection by another vehicle. Thus, if road conditions improve (e.g., due to an increase in temperature that melts ice or snow on the road) or worsen (e.g., due to an accumulation of snow or freezing rain), remote assistance can inform other vehicles of the fleet accordingly.

In a situation where there are passengers, the vehicle or remote assistance may communicate directly or indirectly with the passengers' client computing device. Here, for example, information may be provided to the passengers regarding current driving operations, changes to the route in response to the situation, etc.

Figure 17:
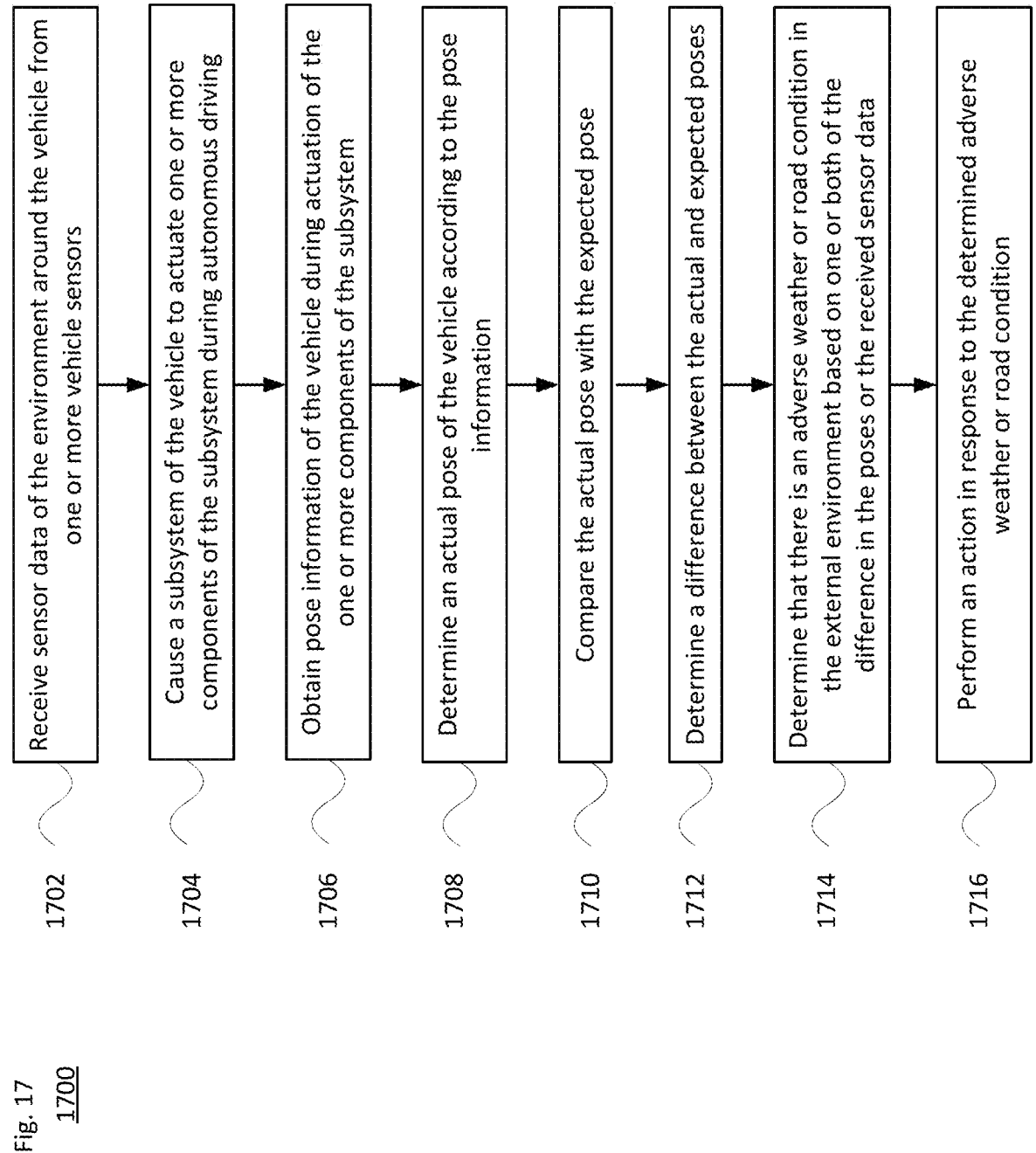
FIG. 17 illustrates an example method in accordance with aspects of the technology.

FIG. 17 illustrates an example method of operation 1700 in accordance with the above discussions. For instance, at block 1702, the on-board processing system receives sensor data of the environment around the vehicle from one or more sensors of the vehicle. At block 1704 one or more processors of the vehicle cause a subsystem of the vehicle to actuate one or more components of the subsystem while in an autonomous driving mode. This may include, by way of example, actuating part of the deceleration system (e.g., 212 in FIG. 2), the acceleration system (e.g., 214 in FIG. 2), the steering system (e.g., 216 in FIG. 2) or a combination thereof. At block 1706, pose information of the vehicle is obtained during actuation of the one or more components.

Based on this pose information, at block 1708 the system determines an actual pose of the vehicle. At block 1710 the actual pose information is compared with an expected pose. The expected pose may be generated, e.g., by the vehicle's planner module. In view of this, at block 1712 the system determines a difference between the actual pose and the expected pose. For instance, the difference may reflect a variance (delta) in a relative distance to another object, in an orientation (e.g., yaw), a direction of travel, etc. At block 1714, based on one or both of the pose difference or the received sensor data, the system determines that there is an adverse weather or road condition in the vehicle's external environment. In one example, the difference may need to exceed a threshold value before the system determines that an adverse weather or road condition exists. In this case, the threshold value may be, e.g., a percentage deviation from an expected baseline (e.g., 2-5% or more or less), a physical distance delta (e.g., greater than 0.2-0.5 m), or some other factor. Thus, one way an adverse weather or road condition can be determined is by the difference exceeding a threshold value. The difference can also be used in other ways, such as in a lookup table with fixed difference values correlating to an adverse weather or road condition. Other aspects may employ a machine learning approach or other model to determine that the difference indicates the presence of an adverse weather or road condition.

Then, at block 1716, the system performs an action in response to the determined adverse weather or road condition. The action may relate to a corrective driving action, a route re-planning action, a modification in a behavior prediction for an object in the environment, providing a notification to another vehicle (such as another vehicle within the vicinity of the vehicle) or a fleet management system or other backend system capable of disseminating information to, or planning or re-planning routes for, other vehicles. In some examples, route re-planning may include designating areas or zones on a map for vehicles to avoid (disengage from).

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A method comprising:
   determining, by one or more processors associated with a vehicle operating in an autonomous driving mode, that it is safe to perform a testing operation along a portion of a roadway to determine a road weather condition;
   causing, by the one or more processors upon determining that it is safe to perform the testing operation, a subsystem of the vehicle to actuate one or more components of the subsystem during operation in the autonomous driving mode according to the testing operation;
   comparing, by the one or more processors, actual vehicle information about the vehicle along the portion of the roadway during actuation of the one or more components with expected information about the vehicle along the portion of the roadway;
   determining, by the one or more processors, that the road weather condition is a wet condition, an icy condition, or a snowy condition along the roadway based on the comparing the actual vehicle information with the expected vehicle information; and
   in response to the determining based on the comparing, the one or more processors causing the vehicle to take a selected action according to whether the road weather condition is the wet condition, the icy condition, or the snowy condition.

2. The method of claim 1, wherein determining that it is safe to perform the testing operation includes determining that there are no surrounding vehicles within a predetermined distance of the vehicle operating in the autonomous driving mode.

3. The method of claim 1, wherein determining that it is safe to perform the testing operation includes determining that a likelihood of losing traction or steering control is below a determined threshold.

4. The method of claim 1, wherein determining that it is safe to perform the testing operation includes determining that there are no passengers in the vehicle.

5. The method of claim 1, wherein causing the subsystem to actuate the one or more components includes causing a braking operation to be performed until information from the subsystem indicates that one or more wheels of the vehicle are starting to lose traction.

6. The method of claim 1, wherein causing the subsystem to actuate the one or more components includes causing braking repeatedly for a selected period of time.

7. The method of claim 1, wherein determining that it is safe to perform the testing operation includes requiring a minimum amount of headway with a trailing vehicle along the portion of the roadway before causing the subsystem to perform a braking operation.

8. The method of claim 1, wherein determining that the road weather condition is the wet condition, the icy condition, or the snowy condition along the roadway based on the comparing the actual vehicle information and the expected vehicle information includes evaluating actual wheel slippage against an expected wheel slippage along the portion of the roadway.

9. The method of claim 1, wherein determining that the road weather condition is the wet condition, the icy condition, or the snowy condition along the roadway based on the comparing the actual vehicle information and the expected vehicle information includes evaluating an actual vehicle pose against an expected vehicle pose along the portion of the roadway.

10. The method of claim 9, wherein the actual vehicle pose is determined based on acquired sensor data obtained by one or more of a lidar sensor, a camera sensor or a radar sensor of the vehicle.

11. The method of claim 1, wherein causing the vehicle to take the selected action includes selecting an amount of braking or an amount of deceleration according to whether the road weather condition is the wet condition, the icy condition, or the snowy condition.

12. The method of claim 1, wherein causing the vehicle to take the selected action includes causing the vehicle to make a driving operation based on an upcoming roadway configuration.

13. The method of claim 1, wherein determining that the road weather condition is the wet condition, the icy condition, or the snowy condition is further based on observing actions by one or more other objects along the roadway.

14. The method of claim 13, further comprising filtering out a spurious sensor signal received by the vehicle based on observing the actions by the one or more other objects along the roadway.

15. The method of claim 1, wherein the selected action is one of: a route re-planning action, causing a modification in a behavior prediction for an object in an environment along the roadway, providing a notification to another vehicle, or providing a notification to a backend system.

16. The method of claim 1, wherein the selection action includes adjusting a future braking profile of the vehicle.

17. A processing system comprising one or more processors configured to:
   determine that it is safe for a vehicle operating in an autonomous driving mode to perform a testing operation along a portion of a roadway to determine a road weather condition;
   cause, upon determining that it is safe to perform the testing operation, a subsystem of the vehicle to actuate one or more components of the subsystem during operation in the autonomous driving mode according to the testing operation;
   compare actual vehicle information about the vehicle along the portion of the roadway during actuation of the one or more components with expected information about the vehicle along the portion of the roadway;
   determine that the road weather condition is a wet condition, an icy condition, or a snowy condition along the roadway based on the comparison of the actual vehicle information with the expected vehicle information; and
   in response to the determination based on the comparison, cause the vehicle to take a selected action according to whether the road weather condition is the wet condition, the icy condition, or the snowy condition.

18. A vehicle comprising:
   the processing system of claim 17; and
   a perception system having one or more sensors operatively coupled to the processing system, the perception system being configured to obtain the actual vehicle information about the vehicle along the portion of the roadway via the one or more sensors.

19. The vehicle of claim 18, wherein determination that it is safe to perform the testing operation includes at least one of: (i) a determination that there are no surrounding vehicles within a predetermined distance of the vehicle operating in the autonomous driving mode, (ii) a determination that a likelihood of losing traction or steering control is below a determined threshold, (iii) a determination that there are no passengers in the vehicle, or (iv) requiring a minimum amount of headway with a trailing vehicle along the portion of the roadway before causing the subsystem to perform a braking operation.

20. The vehicle of claim 18, wherein determination that the road weather condition is the wet condition, the icy condition, or the snowy condition along the roadway based on comparison of the actual vehicle information and the expected vehicle information includes evaluation of an actual vehicle pose against an expected vehicle pose along the portion of the roadway.

* * * * *